US012444846B2

(12) United States Patent
Lin

(10) Patent No.: US 12,444,846 B2
(45) Date of Patent: Oct. 14, 2025

(54) ANTENNA DEVICE

(71) Applicant: RichWave Technology Corp., Taipei (TW)

(72) Inventor: Shih-Kai Lin, Taipei (TW)

(73) Assignee: RichWave Technology Corp., Taipei (TW)

( * ) Notice: Subject to any disclaimer, the term of this patent is extended or adjusted under 35 U.S.C. 154(b) by 180 days.

(21) Appl. No.: 18/536,252

(22) Filed: Dec. 12, 2023

(65) Prior Publication Data

US 2024/0291155 A1 Aug. 29, 2024

(30) Foreign Application Priority Data

Feb. 24, 2023 (TW) ................................ 112106949

(51) Int. Cl.

*H01Q 9/28* (2006.01)
*H01Q 1/36* (2006.01)
*H01Q 1/38* (2006.01)
*H01Q 21/24* (2006.01)

(52) U.S. Cl.

CPC ............... *H01Q 9/285* (2013.01); *H01Q 1/36* (2013.01); *H01Q 1/38* (2013.01); *H01Q 21/24* (2013.01)

(58) Field of Classification Search

CPC .......... H01Q 9/285; H01Q 1/36; H01Q 21/24; H01Q 1/38

See application file for complete search history.

(56) References Cited

U.S. PATENT DOCUMENTS 4,825,220 A * 4/1989 Edward .................. H01Q 9/065 343/846
5,216,430 A * 6/1993 Rahm .................. H01Q 21/065 343/846
6,061,025 A * 5/2000 Jackson ............... H01Q 9/0421 343/745
10,418,701 B2 * 9/2019 Izawa .................... H01Q 1/521
(Continued)

FOREIGN PATENT DOCUMENTS

TW I665827 7/2019

OTHER PUBLICATIONS

"Office Action of Taiwan Counterpart Application", issued on Feb. 27, 2024, p. 1-p. 5.

*Primary Examiner* — Hai V Tran
(74) *Attorney, Agent, or Firm* — JCIPRNET

(57) ABSTRACT

An antenna device includes a first structural layer and a second structural layer. The first structural layer is located at a first plane and includes first antenna structures, a main feeding point, a first subsidiary feeding point and a transmission line. The main feeding point is located between a first transmission line segment and a second transmission line segment, which are respectively connected to different first antenna structures. First transmission paths are formed from the main feeding point to a part of the first antenna structures, and the first transmission paths pass through the first subsidiary feeding point. Second transmission paths are formed from the main feeding point to another part of the first antenna structures. The second structural layer is located at a second plane and includes a conductor, and at least part of projections of the first antenna structures projected onto the second plane surrounds the conductor.

20 Claims, 24 Drawing Sheets

(56) References Cited

U.S. PATENT DOCUMENTS

| | | | | |
|---|---|---|---|---|
| 2004/0001029 | A1* | 1/2004 | Parsche | H01Q 7/00 343/866 |
| 2011/0001577 | A1* | 1/2011 | Lin | H01P 5/12 333/125 |
| 2011/0248900 | A1* | 10/2011 | de Rochemont | H01Q 9/16 343/803 |
| 2013/0076585 | A1* | 3/2013 | Kim | H01Q 9/0435 343/700 MS |
| 2024/0154315 | A1* | 5/2024 | Nemoto | H01Q 9/045 |

* cited by examiner

ANTENNA DEVICE

CROSS-REFERENCE TO RELATED APPLICATION

This application claims the priority benefit of Taiwan application serial no. 112106949, filed on Feb. 24, 2023. The entirety of the above-mentioned patent application is hereby incorporated by reference herein and made a part of this specification.

BACKGROUND

Technical Field

The disclosure relates to an antenna device, and in particular relates to an antenna device with a good pattern.

Description of Related Art

In a conventional antenna structure, if an omnidirectional radiation pattern is to be generated, the antenna is designed as a three-dimensional antenna structure perpendicular to the plane with stronger energy in the radiation pattern. That is, the plane where the antenna is located is substantially parallel to the axis with the smallest radiant energy in the radiation pattern, which requires more space. If a patch antenna with higher order modes is used, a larger area is required.

SUMMARY

An embodiment of the disclosure provides an antenna device including a first structural layer and a second structural layer. The first structural layer is disposed on a first plane, and the first structural layer includes multiple first antenna structures, a main feeding point, a first subsidiary feeding point, and a transmission line. The first antenna structures are separated from each other. The transmission line includes a first transmission line segment and a second transmission line segment. The main feeding point is located between the first transmission line segment and the second transmission line segment. The first transmission line segment is connected to a part of the first antenna structures, and the second transmission line segment is connected to another part of the first antenna structures. Multiple first transmission paths are formed from the main feeding point to the part of the first antenna structures, and the first transmission paths pass through the first subsidiary feeding point. Multiple second transmission paths are formed from the main feeding point to the another part of the first antenna structures. The second structural layer is disposed on a second plane, the second plane is parallel to or coincides with the first plane, the second structural layer includes a conductor, and at least a part of projections of the first antenna structures projected on the second plane surrounds the conductor.

Another embodiment of the disclosure provides an antenna device including a first structural layer and a second structural layer. The first structural layer is disposed on a first plane, and the first structural layer includes two first antenna structures, a transmission line, a main feeding point, and two branch feeding points. The two first antenna structures are separated from each other. Each of the two first antenna structures has a first transmission portion, a first turning portion, and a first radiating portion, and the first turning portion is formed between the first transmission portion and the first radiating portion. Turning directions of the two first antenna structures are opposite to each other. The transmission line connects the first transmission portion of each of the two first antenna structures. The main feeding point is located on the transmission line. Each of the two branch feeding points is located at the first turning portion of the corresponding first antenna structure, and a phase difference between two signals respectively fed from the two branch feeding points is between 150 degrees and 210 degrees. The second structural layer is disposed on a second plane, the second plane is parallel to or coincides with the first plane, and the second structural layer includes two second antenna structures and a conductor. Positions of the two second antenna structures respectively correspond to positions of the two first antenna structures. Each of the two second antenna structures has a second transmission portion, a second turning portion, and a second radiating portion, and the second turning portion is formed between the second transmission portion and the second radiating portion. Turning directions of the two second antenna structures are opposite to each other. The turning direction of each of the two second antenna structures is opposite to the turning direction of the corresponding first antenna structure. The conductor connects the second transmission portion of each of the two second antenna structures.

Based on the above, the antenna device according to an embodiment of the disclosure may provide an omnidirectional radiation pattern, and the space occupied by the antenna device may be relatively small. In addition, with the above configuration, the first transmission path extends from the main feeding point to first pass through the first subsidiary feeding point, then the first transmission path connects to different first antenna structures through the first subsidiary feeding point, and is then divided into multiple segments. Such a configuration is beneficial for impedance conversion. It is easier to adjust the line position according to impedance requirements, and it may concede more space for other electronic components to avoid interference between electronic components and transmission lines or to reduce influence of electronic components on transmission signals. The antenna device of another embodiment of the disclosure may still provide an omnidirectional radiation pattern when the phase difference of the fed signal is between 150 degrees and 210 degrees. A relatively flexible circuit configuration may be provided, the structure of the antenna device is relatively simple, and the occupied space may also be relatively small.

DETAILED DESCRIPTION OF DISCLOSED EMBODIMENTS

Figure 1:
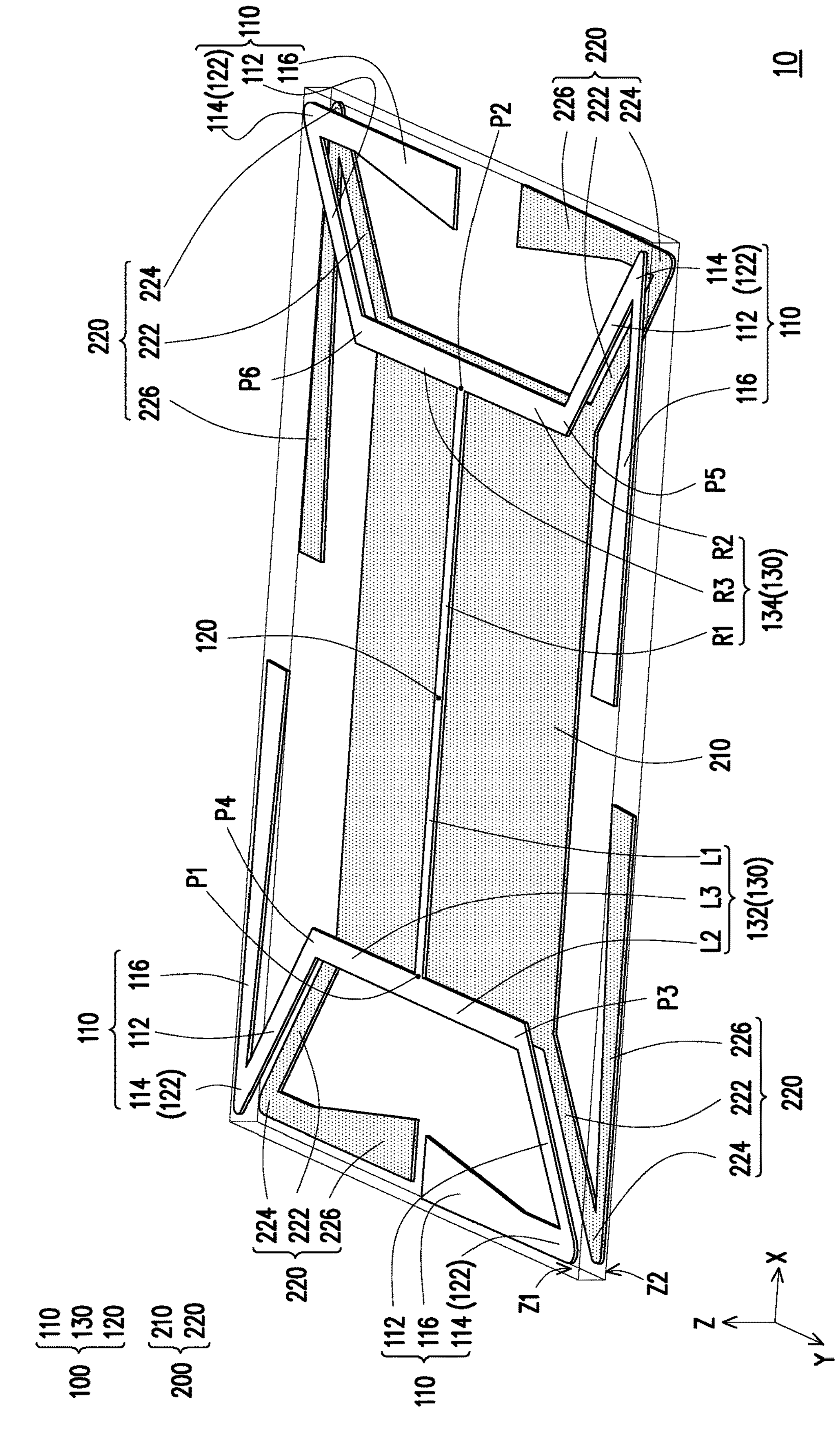
FIG. 1 and FIG. 2 are schematic diagrams of an antenna device according to an embodiment of the disclosure from different viewing angles.
Figure 2:
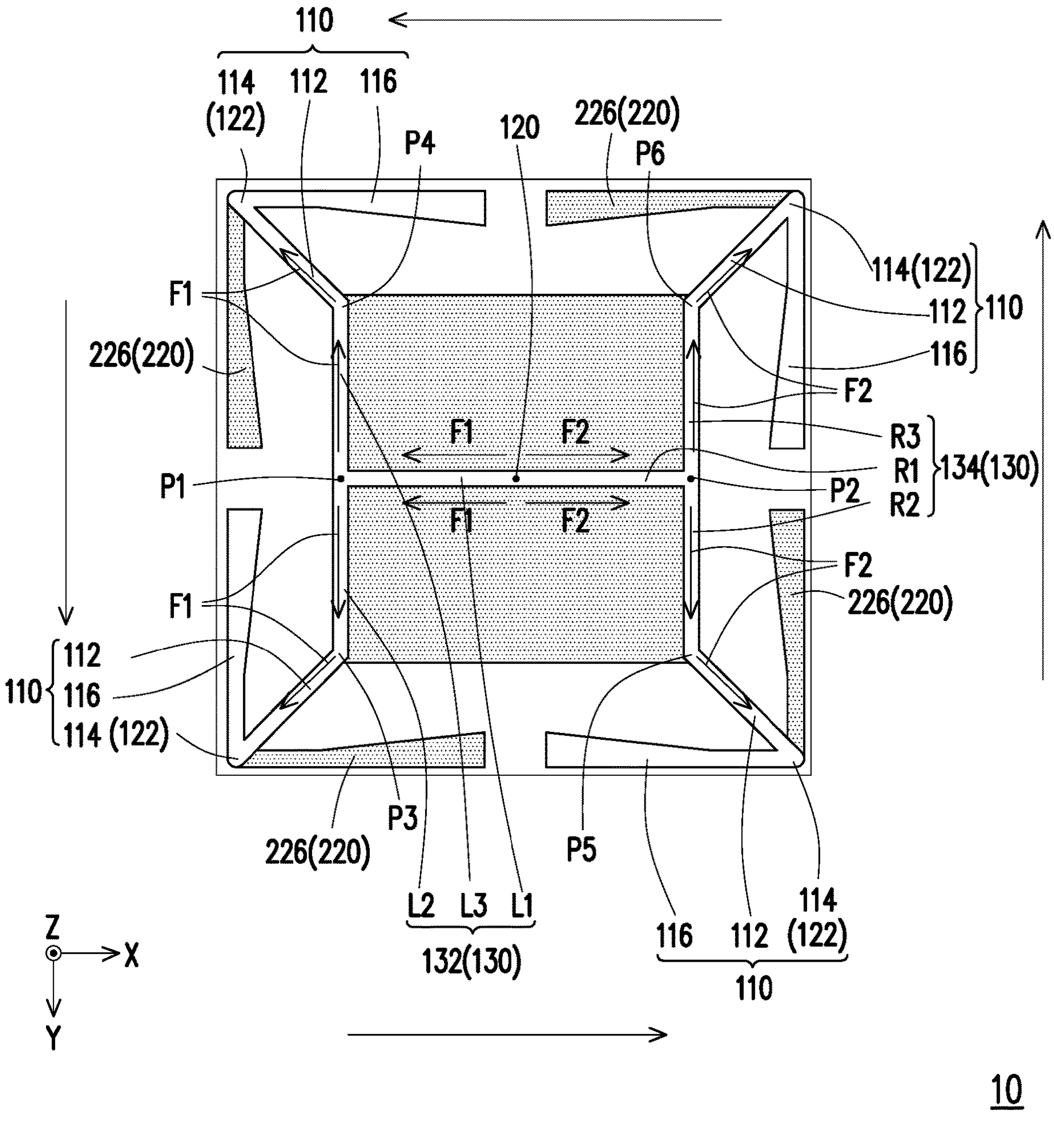

FIG. 1 and FIG. 2 are schematic diagrams of an antenna device according to an embodiment of the disclosure from different viewing angles. Referring to FIG. 1 to FIG. 2, an antenna device 10 of this embodiment includes a first structural layer 100 and a second structural layer 200.

The first structural layer 100 is disposed on a first plane Z1 (e.g., the upper layer of a dielectric substrate, but not limited thereto), and the first structural layer 100 includes multiple first antenna structures 110, a main feeding point 120, and a transmission line 130. The main feeding point 120 is connected to the first antenna structures 110 through the transmission line 130.

In this embodiment, the transmission line 130 includes a first transmission line segment 132 and a second transmission line segment 134. The main feeding point 120 is located between the first transmission line segment 132 and the second transmission line segment 134. The first transmission line segment 132 in connected to a part of the first antenna structures 110, and the second transmission line segment 134 is connected to another part of the first antenna structures 110. In this embodiment, the number of the first antenna structures 110 is, for example, four, but not limited thereto. It may be seen from FIG. 1 that the first antenna structures 110 are separated from each other.

Specifically, the first structural layer 100 further includes a first subsidiary feeding point P1 and a second subsidiary feeding point P2. The first subsidiary feeding point P1 is located on the first transmission line segment 132, and the second subsidiary feeding point P2 is located on the second transmission line segment 134. In this embodiment, the first transmission line segment 132 includes a first sub-line segment L1, a third sub-line segment L2 and a fifth sub-line segment L3. The first sub-line segment L1 is located between the first subsidiary feeding point P1 and the main feeding point 120, and the first subsidiary feeding point P1 is located between the first sub-line segment L1, the third sub-line segment L2, and the fifth sub-line segment L3. The third sub-line segment L2 and the fifth sub-line segment L3 are respectively connected between the first subsidiary feeding point P1 and the corresponding first antenna structures 110 (upper left and lower left first antenna structures 110).

The second transmission line segment 134 includes a second sub-line segment R1, a fourth sub-line segment R2, and a sixth sub-line segment R3. The second sub-line segment R1 is located between the second subsidiary feeding point P2 and the main feeding point 120, and the second subsidiary feeding point P2 is located between the second sub-line segment R1, the fourth sub-line segment R2, and the sixth sub-line segment R3. The fourth sub-line segment R2 and the sixth sub-line segment R3 are respectively connected between the second subsidiary feeding point P2 and the corresponding first antenna structures 110 (upper right and lower right first antenna structures 110). In this embodiment, the first sub-line segment L1 and the second sub-line segment R1 are straight, for example, the first sub-line segment L1 is connected between the first subsidiary feeding point P1 and the main feeding point 120 with the shortest distance, the second sub-line segment R1 is connected between the second subsidiary feeding point P2 and the main feeding point 120 with the shortest distance, but not limited thereto.

In addition, in this embodiment, each of the first antenna structures 110 has a first transmission portion 112, a first turning portion 114, and a first radiating portion 116, and the first turning portion 114 is formed between the first transmission portion 112 and the first radiating portion 116. The first transmission portions 112 of the first antenna structures 110 are connected to the transmission line 130 (e.g., the first transmission portions 112 are respectively connected to the third sub-line segment L2, the fifth sub-line segment L3, the fourth sub-line segment R2, and the sixth sub-line segment R3). The first transmission portion 112 mainly provides the function of transmission, and the first radiating portion 116 mainly provides the function of antenna radiation.

In this embodiment, the width of the first radiating portion 116 of each of the first antenna structures 110, for example, gradually widens from the corresponding first turning portion 114 to the end of the first radiating portion 116, so that the radiation efficiency is relatively good. Of course, the shape of the first radiating portion 116 is not limited thereto.

As shown in FIG. 2, in this embodiment, multiple first transmission paths F1 (e.g., two) are formed from the main feeding point 120 to a part of the first antenna structures 110 (e.g., the two first antenna structures 110 on the upper left and lower left). It may be seen from FIG. 2 that these first transmission paths F1 pass through the first subsidiary feeding point P1. In some embodiments, these first transmission paths F1 share at least a part of the path, that is, a section of the first sub-line segment L1. Likewise, multiple second transmission paths F2 (e.g., two) are formed from the main feeding point 120 to another part of the first antenna structures 110 (e.g., the two first antenna structures 110 on the upper right and lower right). It may be seen from FIG. 2 that these second transmission paths F2 pass through the second subsidiary feeding point P2. In some embodiments, the second transmission paths F2 share at least a part of the path, that is, a section of the second sub-line segment R1. In other embodiments, the first sub-line segment L1 may also form a slit so that the first sub-line segment L1 includes two first transmission paths F1, but they still converge to the first subsidiary feeding point P1; the second sub-line segment R1 may also form a slit so that the second sub-line segment R1 includes two second transmission paths F2, but they still converge to the second subsidiary feeding point P2. In other embodiments, the case that only the first transmission paths F1 pass through the first subsidiary feeding point P1 but the second transmission paths F2 do not pass through the second subsidiary feeding point P2 may also be included.

It should be noted that, in this embodiment, the path from the main feeding point 120 are first divided into two routes to the first transmission line segment 132 and the second transmission line segment 134 as an example. In other embodiments, the transmission line 130 may include more transmission line segments (e.g., more than 3), and the path from the main feeding point 120 may be divided into more routes. The transmission line segments of each route may first extend to the corresponding subsidiary feeding point, and then connect to the corresponding first antenna structures 110 from each subsidiary feeding point. In this case, at least the subsidiary feeding point may be shared, and a part of the path divided from the main feeding point 120 may also be shared.

Returning to FIG. 1, in this embodiment, the second structural layer 200 is disposed on a second plane Z2 (e.g., the lower layer of the dielectric substrate, but not limited thereto). In this embodiment, the second plane Z2 is parallel to the first plane Z1, but in other embodiments, the second plane Z2 may also coincide with the first plane Z1, that is to say, the first plane Z1 may also be coplanar with the second plane Z2.

The second structural layer 200 includes a conductor 210, and at least part of the projections of the first antenna structures 110 projected on the second plane Z2 surrounds the conductor 210. It may be seen from FIG. 2 that in this embodiment, the projections of the first antenna structures 110 projected on the second plane Z2 are located outside the conductor 210, but in other embodiments, the projections of each first antenna structure 110 projected on the second plane Z2 may also be partially located outside the conductor 210 and partially located inside the conductor 210. In this embodiment, the conductor 210 may be coupled to a reference potential or ground.

In this embodiment, the projection of the first subsidiary feeding point P1 projected on the second plane Z2 is located on a first side (e.g., the left side) of the conductor 210, and the projection of the second subsidiary feeding point P2 projected on the second plane Z2 is located on a second side (e.g., the right side) of the conductor 210. The first side is opposite to the second side. Of course, the positions of the first subsidiary feeding point P1 and the second subsidiary feeding point P2 are not limited thereto.

In this embodiment, a shape of the conductor 210 is a polygon, such as a quadrilateral, and the second antenna structures 220 are connected to vertices of the conductor 210. The projection of the main feeding point 120 projected on the second plane Z2 is located at the center of the conductor 210. Of course, in other embodiments, the shape of the conductor 210 may also be another polygon, circle, oval, or irregular shapes including curves. The second antenna structure 220 may also be connected to the side of the conductor 210. The shape of the conductor 210, the position where the second antenna structure 220 is connected to the conductor 210, and the position of the main feeding point 120 are not limited thereto.

In this embodiment, the second structural layer 200 further selectively includes multiple second antenna structures 220, and the positions of the second antenna structures 220 correspond to the positions of the first antenna structures 110. As shown in FIG. 1, each of the second antenna structures 220 has a second transmission portion 222, a second turning portion 224, and a second radiating portion 226, and the second turning portion 224 is formed between the second transmission portion 222 and the second radiating portion 226. The second transmission portions 222 of the second antenna structures 220 are connected to the conductor 210.

In this embodiment, the width of the second radiating portion 226 of each of the second antenna structures 220, for example, gradually widens from the corresponding second turning portion 224 to the end of the second radiating portion 226, so that the radiation efficiency is relatively good. Of course, the shape of the second radiating portion 226 is not limited thereto.

In this embodiment, the first radiating portions 116 and the second radiating portions 226 are dipole antennas. The turning direction (e.g. clockwise) of each of the first antenna structures 110 is opposite to the turning direction (e.g., counterclockwise) of the corresponding second antenna structure 220. In this embodiment, the included angle between the first radiating portion 116 and the corresponding second radiating portion 226 is, for example, 90 degrees.

In this embodiment, the projection of the first transmission portion 112 of each of these first antenna structures 110 projected on the second plane Z2 is at least partially coincident with or parallel to the second transmission portion 222 of the corresponding second antenna structure 220. Taking FIG. 1 and FIG. 2 as an example, the projection of the first transmission portion 112 projected on the second plane Z2 coincides with, for example, the corresponding second transmission portion 222. The projection of the first radiating portion 116 of each of the first antenna structures 110 projected on the second plane Z2 is mirror-symmetrical to the second radiating portion 226 of the corresponding second antenna structure 220 with the second transmission portion 222 as a symmetry axis. In other embodiments, the first radiating portion 116 and the second radiating portion 226 may also be asymmetrical dipole antennas, or other types of feeding dipole antennas. For example, the first radiating portion 116 and the corresponding second radiating portion 226 are not necessarily equal in length. Alternatively, the included angle between the first radiating portion 116 and the corresponding first transmission portion 112 is not necessarily equal to the included angle between the corresponding second radiating portion 226 and the corresponding second transmission portion 222.

Of course, the types of the first radiating portion 116 and the second radiating portion 226 are not limited thereto. In other embodiments, the first radiating portion 116 and the second radiating portion 226 may also be planar inverted-F antennas (PIFA), loop antennas, or monopole antennas.

As shown in FIG. 2, the turning directions of the first antenna structures 110 are the same (all clockwise or all counterclockwise). The first antenna structures 110 are, for example, arranged rotationally symmetrical with the center of the projection of the conductor 210 projected on the first plane Z1 (FIG. 2) as the symmetrical point. The turning directions of the second antenna structures 220 are the same (all counterclockwise or all clockwise). The second antenna structures 220 are, for example, arranged rotationally symmetrical with the center of the conductor 210 as the symmetrical point. The first antenna structures 110 and the second antenna structures 220 are, for example, arranged radially with the center of the conductor 210, that is, evenly located around the conductor 210.

Therefore, taking FIG. 2 as an example, when the antenna device 10 operates, during a period of time, the first radiating portions 116 of the first antenna structures 110 and the second radiating portions 226 of the second antenna structures 220 form radiation currents that are also counterclockwise (referring to a current group, as shown in the arrow on the periphery of the antenna device 10 in FIG. 2). During another period of operation of the antenna device 10, the first radiating portions 116 of the first antenna structures 110 and the second radiating portions 226 of the second antenna structures 220 may also form radiation currents that are also clockwise, so that the antenna device 10 form an omnidirectional radiation pattern. Furthermore, since the antenna resonance is periodic, at different time points in the period, the above-mentioned radiation current flows alternately in the counterclockwise and clockwise states.

It should be noted that although the radiation currents formed by the first radiating portion 116 and the second radiating portion 226 may not be completely in the same direction at the beginning and end of the antenna resonance period, during most of the resonance period, the radiation current formed by the first radiating portion 116 and the second radiating portion 226 flows in a clockwise direction as described above.

Figure 3A:
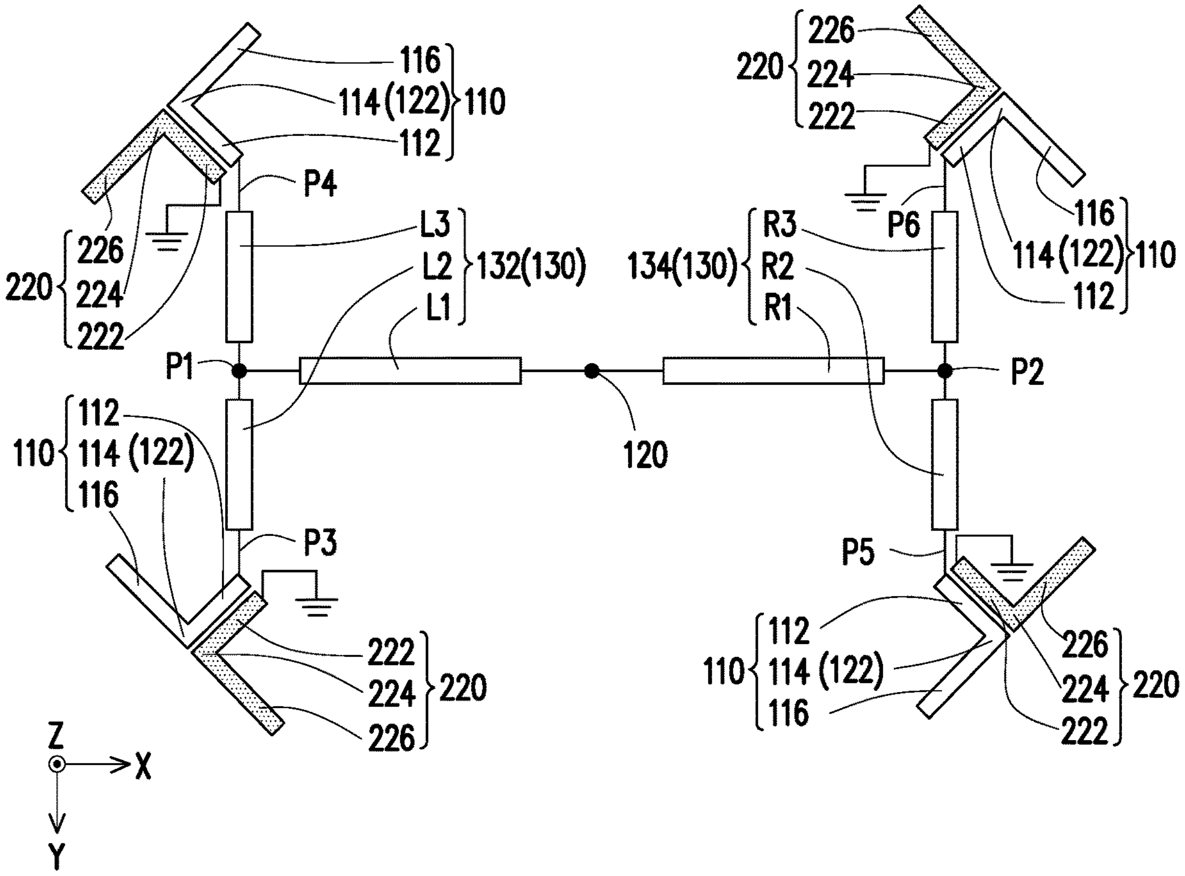
FIG. 3A is a simplified circuit configuration diagram in which the conductor of the antenna device of FIG. 1 is hidden.

FIG. 3A is a simplified circuit configuration diagram in which the conductor of the antenna device of FIG. 1 is hidden. Referring to FIG. 3A, in this embodiment, the lengths of the first sub-line segment L1 and the second sub-line segment R1 are equal, so that the phase difference between the first subsidiary feeding point P1 and the second subsidiary feeding point P2 is 0. In other embodiments, the length difference between the first sub-line segment L1 and the second sub-line segment R1 may satisfy that the phase difference between the first subsidiary feeding point P1 and the second subsidiary feeding point P2 is plus or minus n*360 degrees, which also means the phase difference is 0, that is, the first subsidiary feeding point P1 and the second subsidiary feeding point P2 are in the same phase to form in-phase feeding.

In addition, in this embodiment, the four first antenna structures 110 include four first transmission portions 112. The first transmission portion 112 on the lower left is connected to the third sub-line segment L2 through a first junction point P3, the first transmission portion 112 on the lower right is connected to the fourth sub-line segment R2 through a second junction point P5, the first transmission portion 112 on the upper left is connected to the fifth sub-line segment L3 through a third junction point P4, and the first transmission portion 112 on the upper right is connected to the sixth sub-line segment R3 through a fourth junction point P6.

In this embodiment, the phase difference between the first junction point P3 and the second junction point P5 of the signal fed from the main feeding point 120 is within plus or minus 30 degrees, and the phase difference between the third junction point P4 and the fourth junction point P6 of the signal fed from the main feeding point 120 is within plus or minus 30 degrees. In addition, the phase difference between the first junction point P3 and the third junction point P4 of the signal fed from the main feeding point 120 is within plus or minus 30 degrees, and the phase difference between the second junction point P5 and the fourth junction point P6 of the signal fed from the main feeding point 120 is within plus or minus 30 degrees. In addition, according to the microwave circuit theory, the addition and subtraction of n*360 degrees For each phase is also the same as the original phase. Therefore, if the phase difference is 0 to 30 degrees plus or minus n*360 degrees, it also means that the phase difference is 0 to 30 degrees, and if the phase difference is −30 to 0 degrees plus or minus n*360 degrees, it also means that the phase difference is −30 to 0 degrees, the following descriptions about the phase difference may be explained accordingly.

For example, in this embodiment, the total length of the first sub-line segment L1 and the third sub-line segment L2 is the same as the total length of the second sub-line segment R1 and the fourth sub-line segment R2. The total length of the first sub-line segment L1 and the fifth sub-line segment L3 is the same as the total length of the second sub-line segment R1 and the sixth sub-line segment R3. The length of the third sub-line segment L2 is equal to the length of the fifth sub-line segment L3, and the length of the fourth sub-line segment R2 is equal to the length of the sixth sub-line segment R3. It should be noted that the above-mentioned length is not limited thereto. Furthermore, in the case of conforming to the above-mentioned microwave circuit theory, extending or shortening the length of the sub-line segment of the above-mentioned transmission line may also form in-phase feeding.

Therefore, in this embodiment, the phase difference between the first junction point P3 and the second junction point P5 of the signal fed from the main feeding point 120 is 0, and the phase difference between the third junction point P4 and the fourth junction point P6 of the signal fed from the main feeding point 120 is 0. The phase difference between the first junction point P3 and the third junction point P4 of the signal fed from the main feeding point 120 is 0, and the phase difference between the second junction point P5 and the fourth junction point P6 of the signal fed from the main feeding point 120 is 0. It should be noted that, as mentioned above, in other embodiments, if the phase difference is plus or minus n*360 degrees, it also means that the phase difference is 0, and in-phase feeding may be formed.

In addition, in this embodiment, the first structural layer 100 further includes multiple branch feeding points 122, and each of the branch feeding points 122 is located at the first turning portion 114 of the corresponding first antenna structure 110. The phase differences of the signals respectively fed from these branch feeding points 122 are within plus or minus 30 degrees (e.g., the phase difference is 0). Therefore, the four first radiating portions 116 are fed in the same phase, so that the radiated current surrounding the antenna device 10 flows in the same direction (counterclockwise or clockwise) at the same time.

It should be noted that, in other embodiments, the length of the first sub-line segment L1, the third sub-line segment L2, the fifth sub-line segment L3, the second sub-line segment R1, the fourth sub-line segment R2, or the sixth sub-line segment R3 may also be is 0, that is, even if one or several of them are omitted, as long as the length of the remaining line segments is adjusted, a same-phase feed may still be achieved, without being limited by the diagram.

It is worth mentioning that, the first transmission path F1 of the antenna device 10 in this embodiment extends from the main feeding point 120 to first pass through the first subsidiary feeding point P1, then the first transmission path F1 connects to different first antenna structures 110 through the first subsidiary feeding point P1, and is then divided into multiple segments. Such a configuration is beneficial for impedance conversion. It is easier to adjust the line position according to impedance requirements, and it may concede more space for other electronic components to avoid interference between electronic components and transmission lines or to reduce influence of electronic components on transmission signals.

Figure 3B:
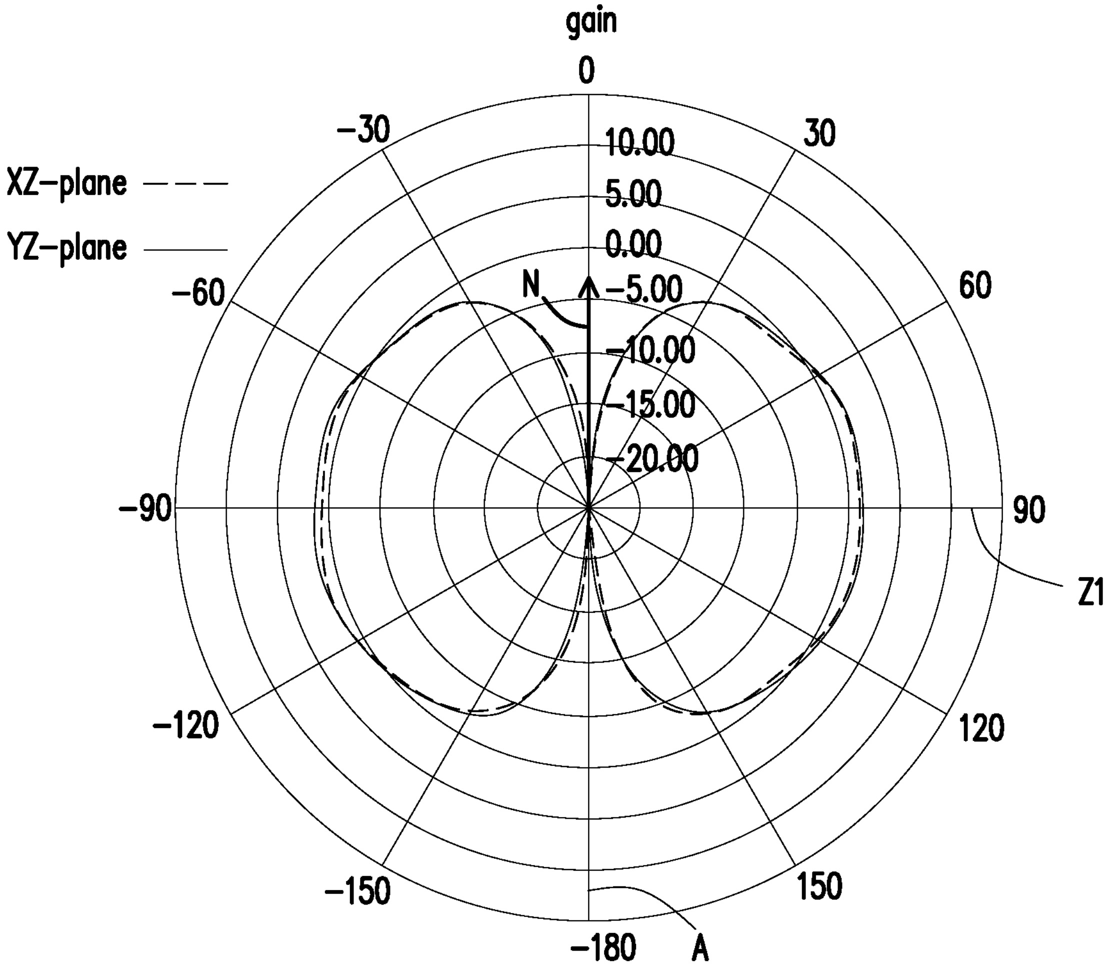
FIG. 3B is a radiation pattern diagram of the antenna device in FIG. 1.

FIG. 3B is a radiation pattern diagram of the antenna device in FIG. 1. Referring to FIG. 3B, FIG. 3B is a radiation pattern generated by the antenna device 10 of FIG. 1. FIG. 3B shows the cross-section of the radiation pattern on the XZ plane and the cross-section of the radiation pattern on the YZ plane, and shows that the radiation pattern is an omnidirectional pattern. In addition, referring to FIG. 1, FIG. 2, and FIG. 3B together, in the radiation pattern of FIG. 3B, the included angle between an axis A (along 0 to 180 degrees) with the smallest radiation energy and the normal line N of the first plane Z1 is greater than or equal to 0 degrees and less than or equal to 20 degrees. Furthermore, corresponding to the coordinate axes in FIG. 1 and FIG. 2, the extension direction of the axis A in FIG. 3B is the Z-axis direction in FIG. 1 and FIG. 2. For example, in the embodiment shown in FIG. 3B, the included angle between the axis A and the normal line N of the first plane Z1 is substantially 0 degrees, that is, the axis A is substantially perpendicular to the first plane Z1. In other embodiments, the omnidirectional radiation pattern may not be completely symmetrical. In this case, the included angle between the axis A with the smallest radiation energy and the normal line N of the first plane Z1 may be greater than 0 degrees but less than or equal to 20 degrees.

In a conventional antenna structure, if an omnidirectional radiation pattern is to be generated, the antenna is designed as a three-dimensional antenna structure perpendicular to the plane with stronger energy in the radiation pattern. That is, the plane where the antenna is located is substantially parallel to the axis with the smallest radiant energy in the radiation pattern, which requires more space. The space occupied by the antenna device 10 of this embodiment may be relatively small, and an omnidirectional radiation pattern may be formed.

Antenna devices of other embodiments are introduced below. The same or similar elements as those of the antenna device in FIG. 1 are denoted by the same or similar reference numerals, and further details are not repeated herein, only the main differences are described.

Figure 4:
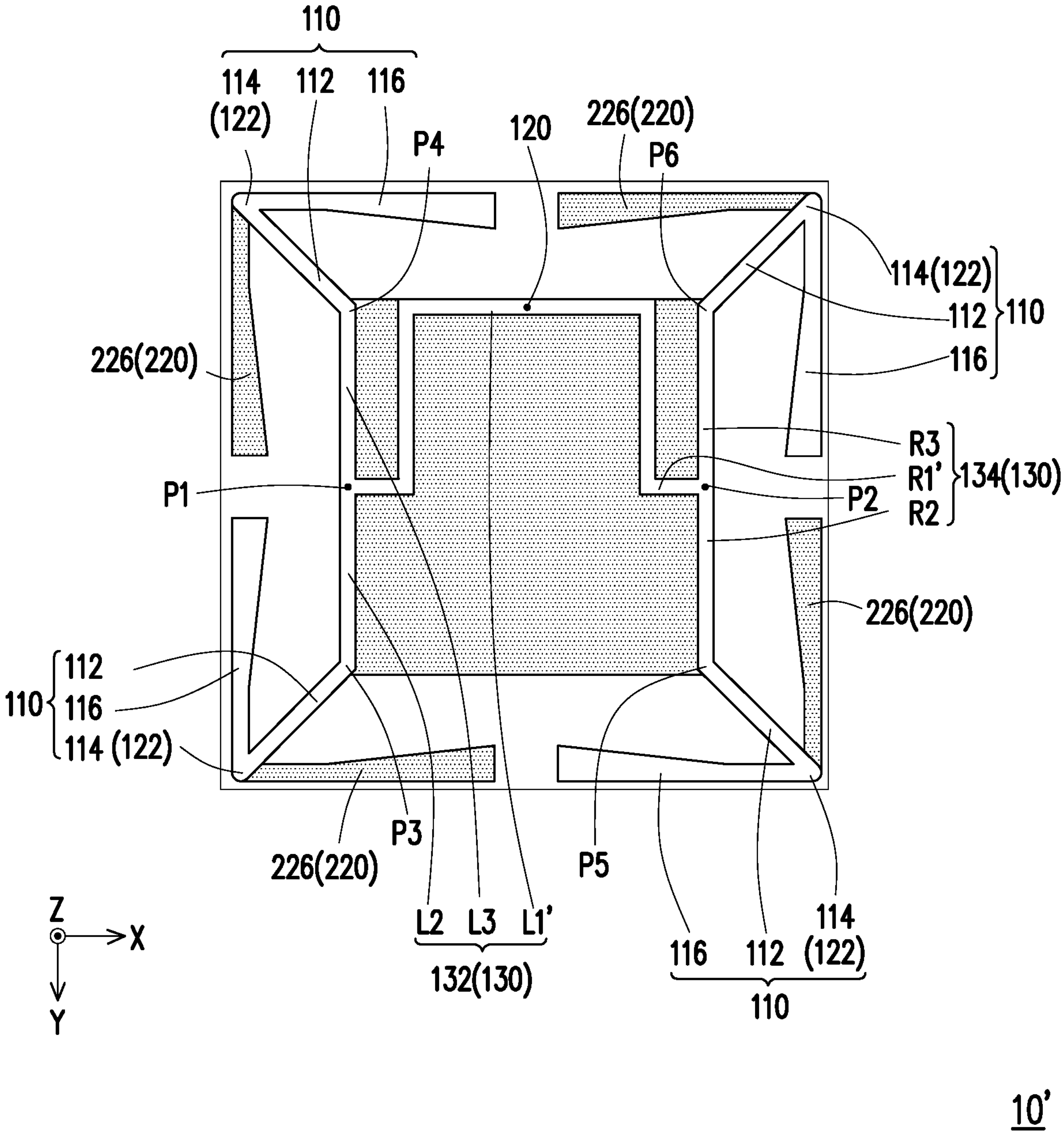
FIG. 4 is a top schematic view of an antenna device according to another embodiment of the disclosure.

FIG. 4 is a top schematic view of an antenna device according to another embodiment of the disclosure. Referring to FIG. 4, the main difference between the antenna device 10' of FIG. 4 and the antenna device 10 of FIG. 2 is that in this embodiment, the projection of the main feeding point 120 of the antenna device 10' projected on the second plane Z2 (FIG. 1) deviates from the center of the conductor 210. More specifically, the projection position of the main feeding point 120 in this embodiment is located at the edge of the conductor 210. Such a design may concede more space above the conductor 210 to provide a relatively complete space for electronic components (not shown) such as chips to be placed, so as to avoid interference between the electronic components and the transmission lines or reduce the influence of the electronic components on the transmission signals.

Since the projection position of the main feeding point 120 is located at the edge of the conductor 210, and the positions of the first subsidiary feeding point P1 and the second subsidiary feeding point P2 are still located in the center of the left and right edges of the conductor 210, the first sub-line segment L1' and the second sub-line segment R1' are bent.

Likewise, in this embodiment, the lengths of the first sub-line segment L1' and the second sub-line segment R1' are equal, so that the phase difference between the first subsidiary feeding point P1 and the second subsidiary feeding point P2 is 0. In other embodiments, the length difference between the first sub-line segment L1' and the second sub-line segment R1' may satisfy that the phase difference between the first subsidiary feeding point P1 and the second subsidiary feeding point P2 is plus or minus n*360 degrees. In this way, the embodiment of FIG. 4 may still be an in-phase feeding situation, similar to the feeding situation of FIG. 1 and FIG. 2. The turning directions of the first antenna structures 110 in the embodiment of FIG. 4 are the same (all clockwise or all counterclockwise). For example, they are arranged in rotational symmetry. The turning directions of the second antenna structures 220 are the same (all counterclockwise or all clockwise). For example, they are arranged in rotational symmetry.

Figure 5:
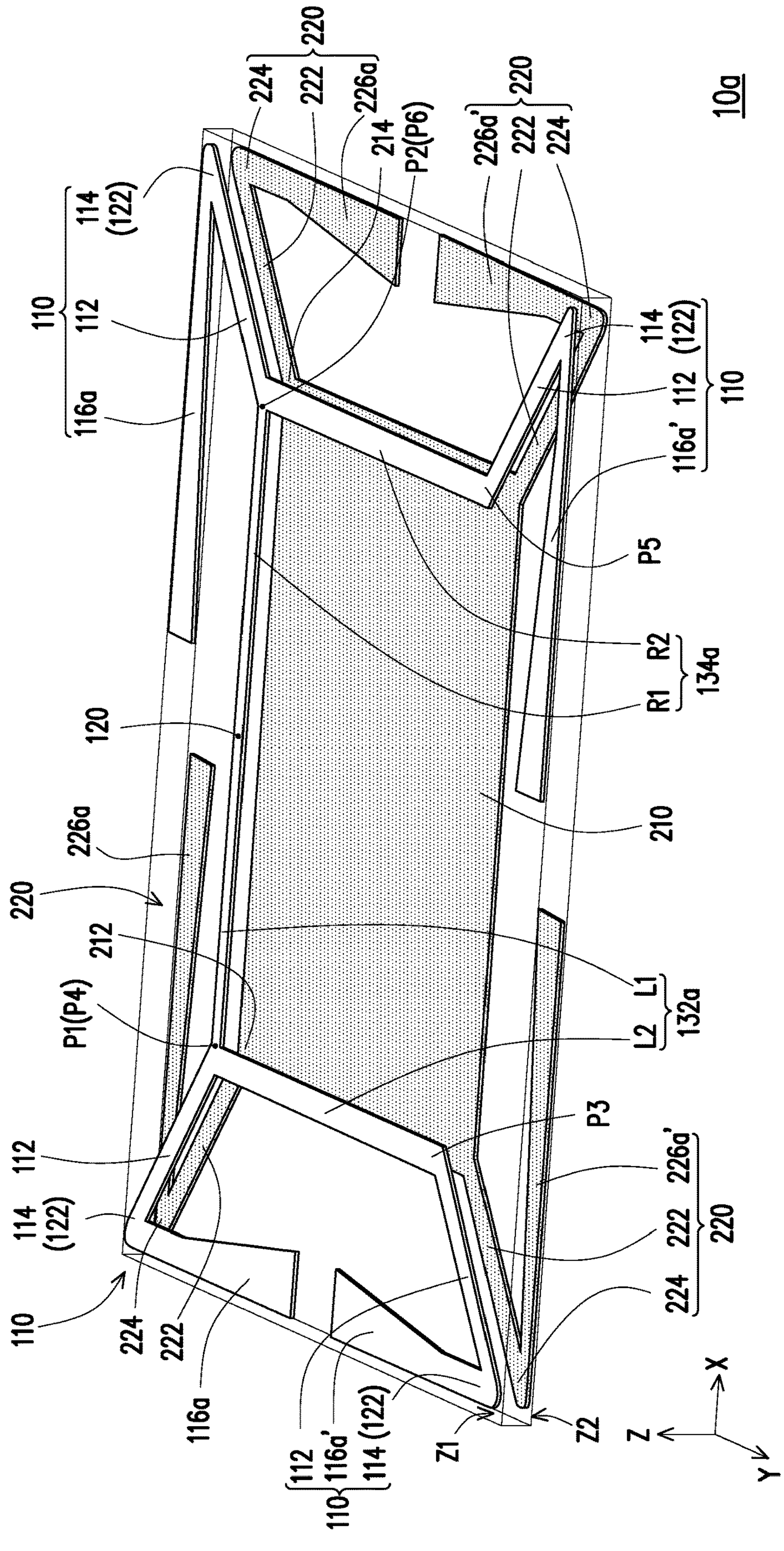
FIG. 5 and FIG. 6 are schematic diagrams of an antenna device according to another embodiment of the disclosure from different viewing angles.
Figure 6:
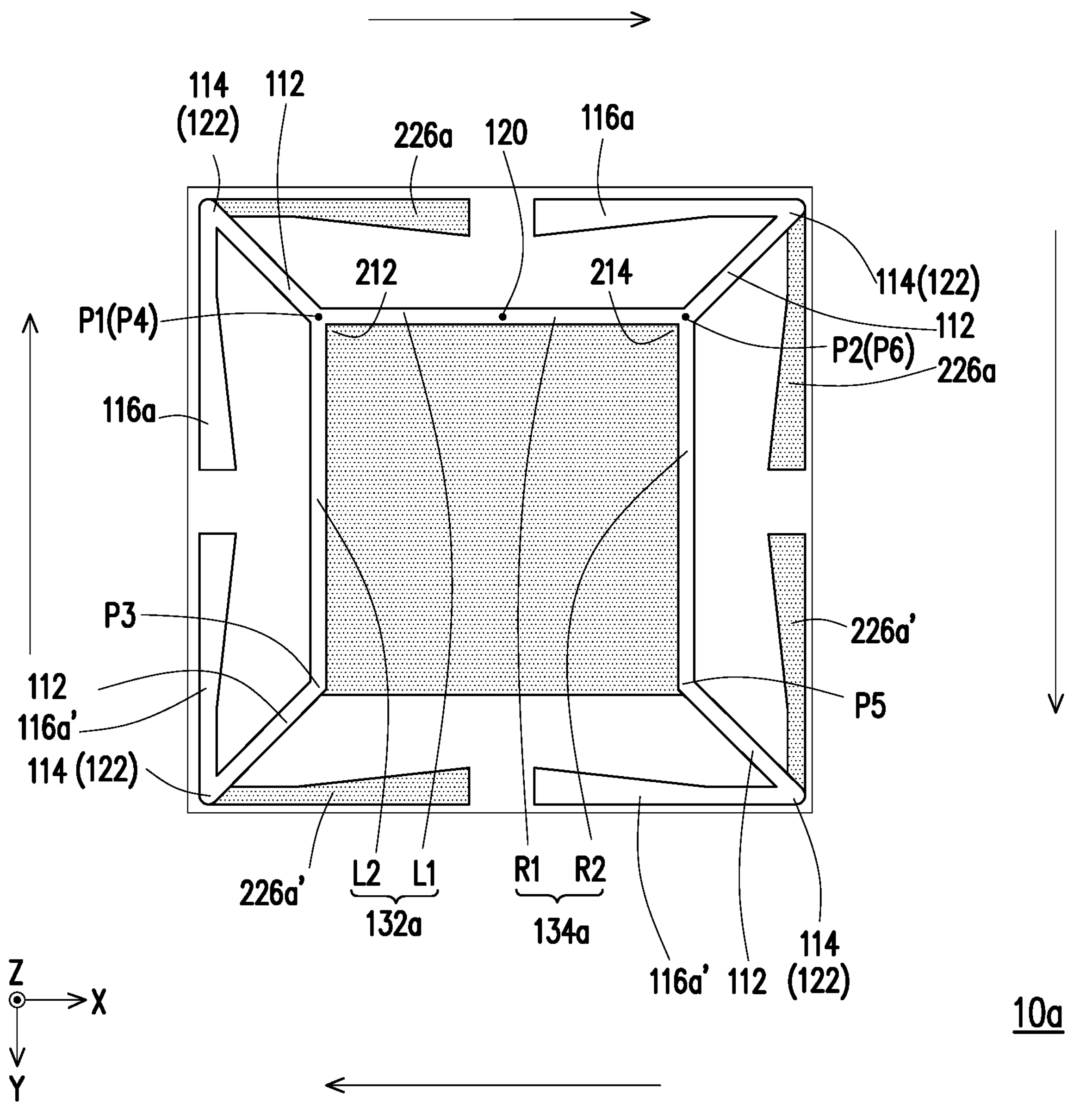

FIG. 5 and FIG. 6 are schematic diagrams of an antenna device according to another embodiment of the disclosure from different viewing angles. Referring to FIG. 5 and FIG. 6, the main difference between the antenna device **10*a* of FIG. 5 and the antenna device 10 of FIG. 1 is that in this embodiment, the projection of the main feeding point 120 projected on the second plane Z2 deviates from the center of the conductor 210. The projection position of the main feeding point 120 in this embodiment is located at the upper edge of the conductor 210. In this way, the phase difference of some of the branch feeding points 122 changes correspondingly, so that the design of the first antenna structure 110 and the second antenna structure 220** must be changed accordingly, which is further described below.

The projection of the first subsidiary feeding point P1 projected on the second plane Z2 is, for example, located at the corner of the conductor 210, such as a first vertex 212 at the upper left corner, and the projection of the second subsidiary feeding point P2 projected on the second plane Z2 is, for example, located at the corner of the conductor 210, such as a second vertex 214 at the upper right corner. The first sub-line segment L1 and the second sub-line segment R1 are still straight. In addition, in other embodiments, on the basis of the antenna device **10*a* in FIG. 5, the positions of the first subsidiary feeding point P1 and the second subsidiary feeding point P2 are maintained, but the main feeding point 120 is, for example, disposed such that the projection on the second plane Z2 is located at the center of the conductor 210, and the first sub-line segment L1 and the second sub-line segment R1** are bent. In this way, if it is matched with other electronic components, the type of transmission line may be adjusted according to the configuration requirements.

The first transmission line segment **132*a* includes a first sub-line segment L1 and a third sub-line segment L2. The first sub-line segment L1 is located between the first subsidiary feeding point P1 and the main feeding point 120. The first subsidiary feeding point P1 is located between the first sub-line segment L1, the third sub-line segment L2, and the first antenna structure 110** on the upper left.

The second transmission line segment **134*a* includes a second sub-line segment R1 and a fourth sub-line segment R2. The second sub-line segment R1 is located between the second subsidiary feeding point P2 and the main feeding point 120. The second subsidiary feeding point P2 is located between the second sub-line segment R1, the fourth sub-line segment R2, and the first antenna structure 110** on the upper right.

That is to say, the antenna device **10*a* in FIG. 5 does not have the fifth sub-line segment L3 and the sixth sub-line segment R3 in the antenna device 10 of FIG. 1**.

In this embodiment, the first transmission portion 112 on the lower left is connected to the third sub-line segment L2 through the first junction point P3, and the first transmission portion 112 on the lower right is connected to the fourth sub-line segment R2 through the second junction point P5.

Figure 7:
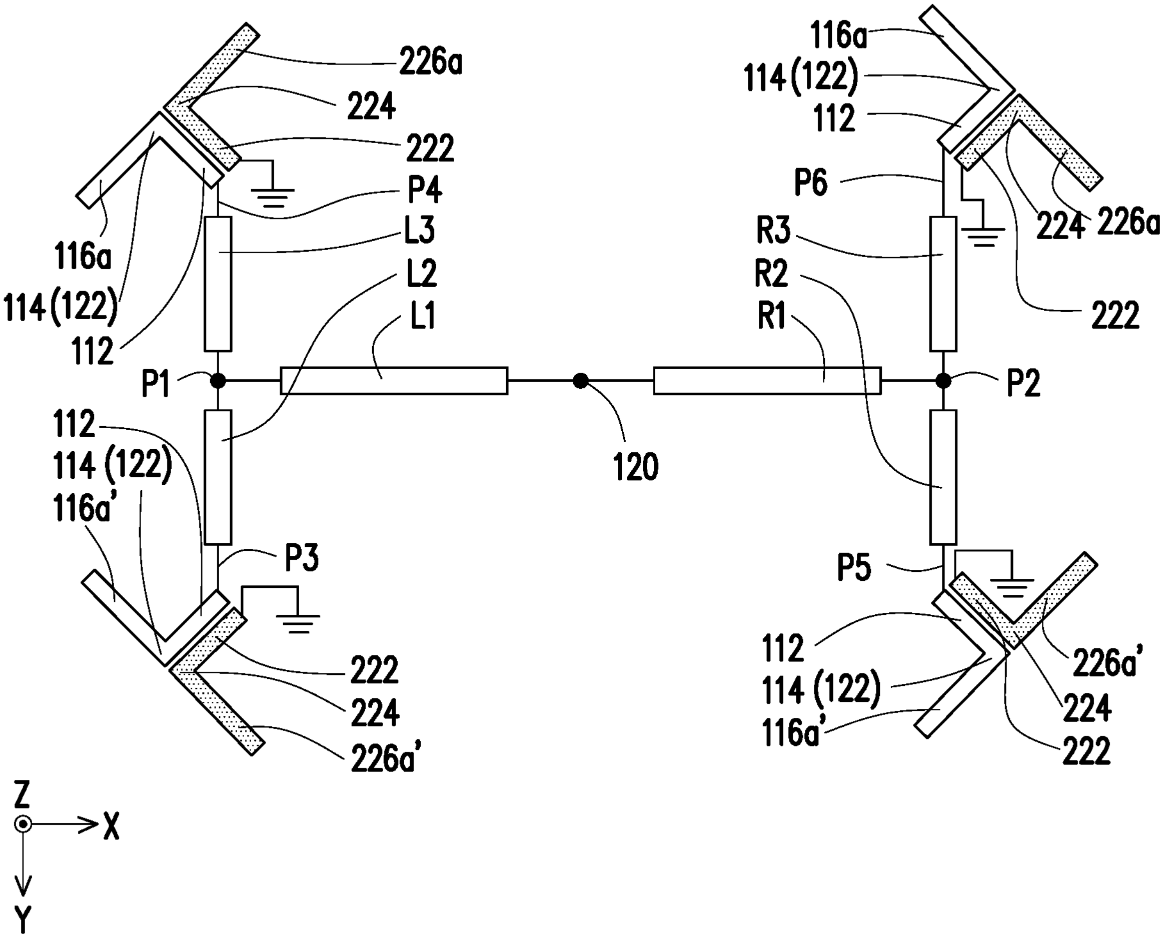
FIG. 7 is a simplified circuit configuration diagram in which the conductor of the antenna device of FIG. 5 is hidden.

FIG. 7 is a simplified circuit configuration diagram in which the conductor of the antenna device of FIG. 5 is hidden. Referring to FIG. 7, FIG. 7 shows the fifth sub-line segment L3 and the sixth sub-line segment R3, but in this embodiment, both the fifth sub-line segment L3 and the sixth sub-line segment R3 are, for example, 0. Therefore, the phase difference between one part and another part of the multiple signals fed from these branch feeding points 122 is between 150 degrees and 210 degrees. For example, the phase difference between the feed signal of the branch feeding point 122 on the upper right and the feed signal of the branch feeding point 122 on the lower right is between 150 degrees and 210 degrees. The phase difference between the feed signal of the branch feeding point 122 on the upper left and the feed signal of the branch feeding point 122 on the lower left is between 150 degrees and 210 degrees. In this way, referring to FIG. 5, FIG. 6, and FIG. 7 at the same time, the turning direction of the first antenna structure 110 corresponding to one part of the signal is opposite to the turning direction of the first antenna structure 110 corresponding to another part of the signal. For example, the turning direction (e.g., counterclockwise) of the first antenna structure 110 on the upper right is opposite to the turning direction (e.g., clockwise) of the first antenna structure 110 on the lower right. The turning direction (e.g., counterclockwise) of the first antenna structure 110 on the upper left is opposite to the turning direction (e.g., clockwise) of the first antenna structure 110 on the lower left. Similarly, for example, the turning direction (e.g., clockwise) of the second antenna structure 220 on the upper right is opposite to the turning direction (e.g., counterclockwise) of the second antenna structure 220 on the lower right. The turning direction (e.g., clockwise) of the second antenna structure 220 on the upper left is opposite to the turning direction (e.g., counterclockwise) of the second antenna structure 220 on the lower left. On the other hand, in this embodiment, the phase difference between the feed signal of the branch feeding point 122 on the upper left and the feed signal of the branch feeding point 122 on the upper right is within plus or minus 30 degrees, while the phase difference between the feed signal of the branch feeding point 122 on the lower left and the feed signal of the branch feeding point 122 of the lower right is within plus or minus 30 degrees. In other embodiments, the fifth sub-line segment L3 and the sixth sub-line segment R3 may also be other lengths that may cause phase differences between different signals fed from some of the branch feeding points 122 to be between 150 degrees and 210 degrees.

In addition, in this embodiment, referring to FIG. 5, FIG. 6, and FIG. 7 at the same time, the four first antenna structures 110 include four first transmission portions 112. The first transmission portions 112 on the lower left and upper left are respectively connected to two ends of the third sub-line segment L2 through the first junction point P3 and the third junction point P4, and the first transmission portions 112 on the lower right and upper right are respectively connected to two ends of the fourth sub-line segment R2 through the second junction point P5 and the fourth junction point P6. The phase difference between the first junction point P3 and the second junction point P5 of the signal fed from the main feeding point 120 is within plus or minus 30 degrees. For example, the total length of the first sub-line segment L1 and the third sub-line segment L2 is the same as the total length of the second sub-line segment R1 and the fourth sub-line segment R2. Therefore, the phase difference between the first junction point P3 and the second junction point P5 of the signal fed from the main feeding point 120 is, for example, 0, but not limited thereto.

In the antenna device 10*a* of this embodiment, because the positions of the first subsidiary feeding point P1, the second subsidiary feeding point P2, and the main feeding point 120 change, the fifth sub-line segment L3 and the sixth sub-line segment R3 are both 0. That is, the first subsidiary feeding point P1, for example, coincides with the third junction point P4, and the second subsidiary feeding point P2, for example, coincides with the fourth junction point P6. In this way, the lengths of the transmission lines connected to the upper two first antenna structures 110 and the lower two first antenna structures 110 are different, thus causing the feeding phases of the upper two first antenna structures 110 and the lower two first antenna structures 110 to be different. In other embodiments, the first subsidiary feeding point P1 may not coincide with the third junction point P4, the second subsidiary feeding point P2 may not coincide with the fourth junction point P6, and the feeding phase may be adjusted by changing the length configuration of the transmission line.

Furthermore, the phase difference between the first junction point P3 and the third junction point P4 of the signal fed from the main feeding point 120 is between 150 degrees and 210 degrees. For example, the phase difference is 180 degrees in this embodiment. The phase difference between the second junction point P5 and the fourth junction point P6 of the signal fed from the main feeding point 120 is between 150 degrees and 210 degrees. For example, the phase difference is 180 degrees in this embodiment. Therefore, in antenna configuration, the turning direction of the first antenna structure 110 on the upper left (having the first radiating portion 116*a*) is opposite to the turning direction of the first antenna structure 110 on the lower left (having the first radiating portion 116*a*') (counterclockwise and clockwise), and they are mirror-symmetrical. The turning direction of the first antenna structure 110 on the upper right (having the first radiating portion 116*a*) is opposite to the turning direction of the first antenna structure 110 on the lower right (having the first radiating portion 116*a*') (counterclockwise and clockwise), and they are mirror-symmetrical.

Similarly, the turning direction of the second antenna structure 210 on the upper left (having the second radiating portion 226*a*) is opposite to the turning direction of the second antenna structure 210 on the lower left (having the second radiating portion 226*a*') (clockwise and counterclockwise), and they are mirror-symmetrical. The turning direction of the second antenna structure 210 on the upper right (having the second radiating portion 226*a*) is opposite to the turning direction of the second antenna structure 210 on the lower right (having the second radiating portion 226*a*') (clockwise and counterclockwise), and they are mirror-symmetrical.

Such a design enables the first radiating portions 116*a* and 116*a*' and the second radiating portions 226*a* and 226*a*' of the antenna device 10*a* to form radiation currents in the same clock direction (clockwise or counterclockwise), so that the antenna device 10*a* may form an omnidirectional radiation pattern.

Figure 8:
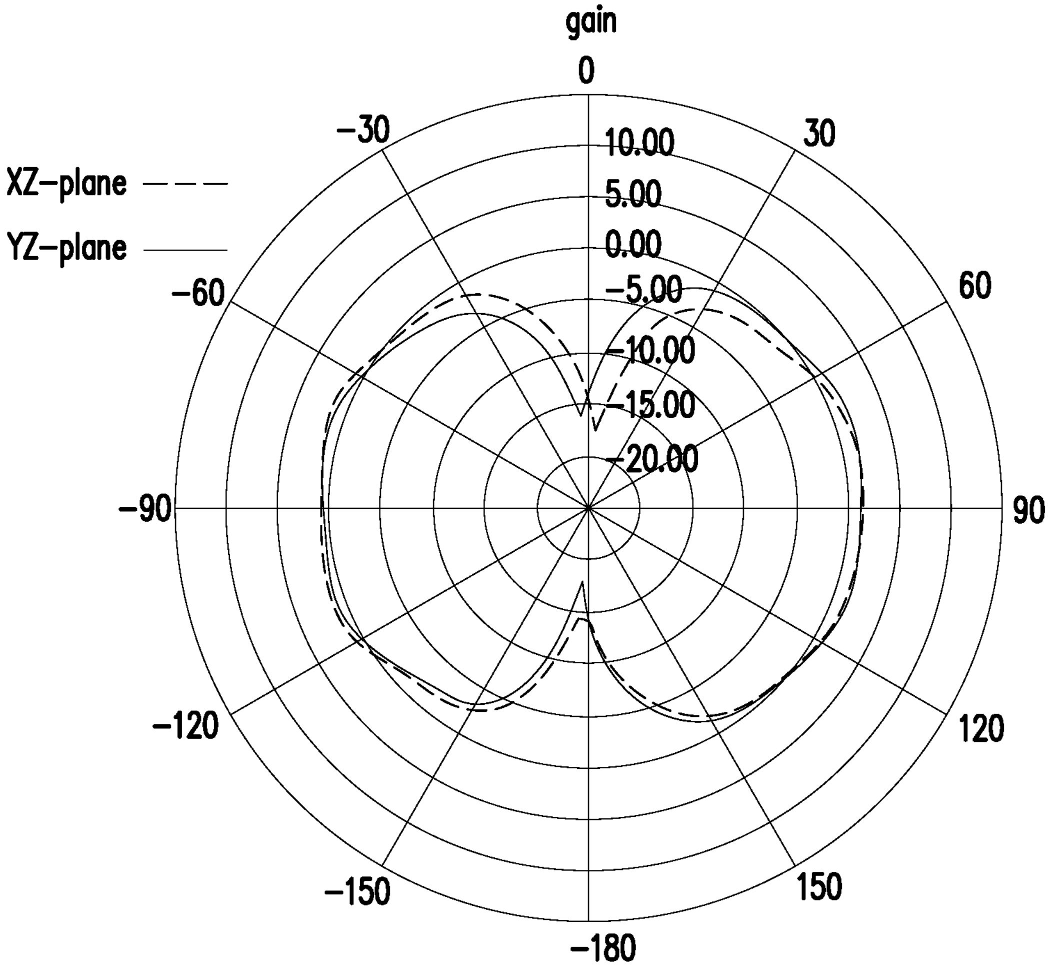
FIG. 8 is a radiation pattern diagram of the antenna device in FIG. 5.

FIG. 8 is a radiation pattern diagram of the antenna device in FIG. 5. Please refer to FIG. 8, FIG. 8 is the radiation pattern produced by the antenna device 10*a* of FIG. 5. FIG. 8 shows the cross-section of the radiation pattern on the XZ plane and the cross-section of the radiation pattern on the YZ plane. It may be verified from FIG. 8 that the radiation pattern of the antenna device 10*a* in FIG. 5 is an omnidirectional pattern, and has good performance.

Figure 9:
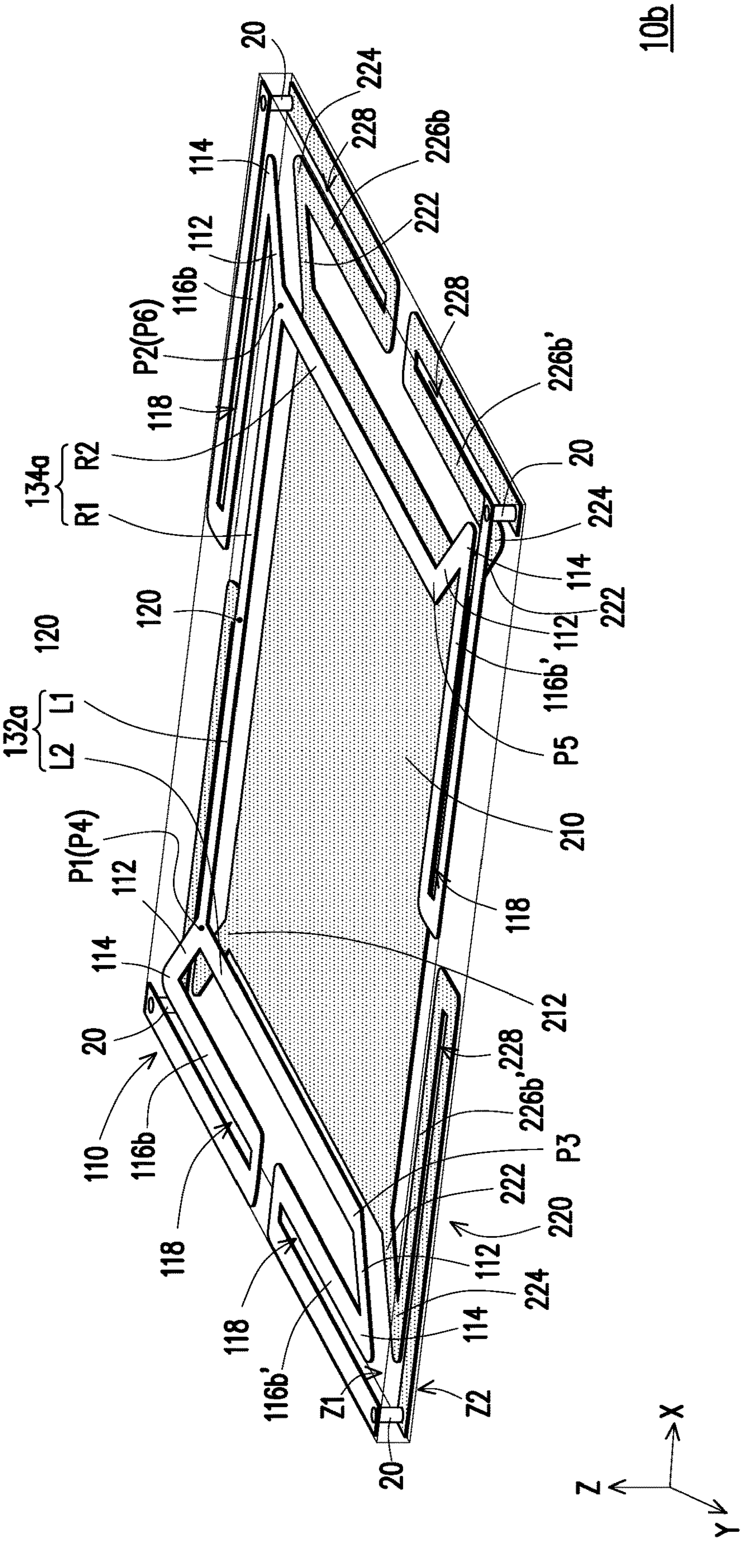
FIG. 9 and FIG. 10 are schematic diagrams of an antenna device according to another embodiment of the disclosure from different viewing angles.
Figure 10:
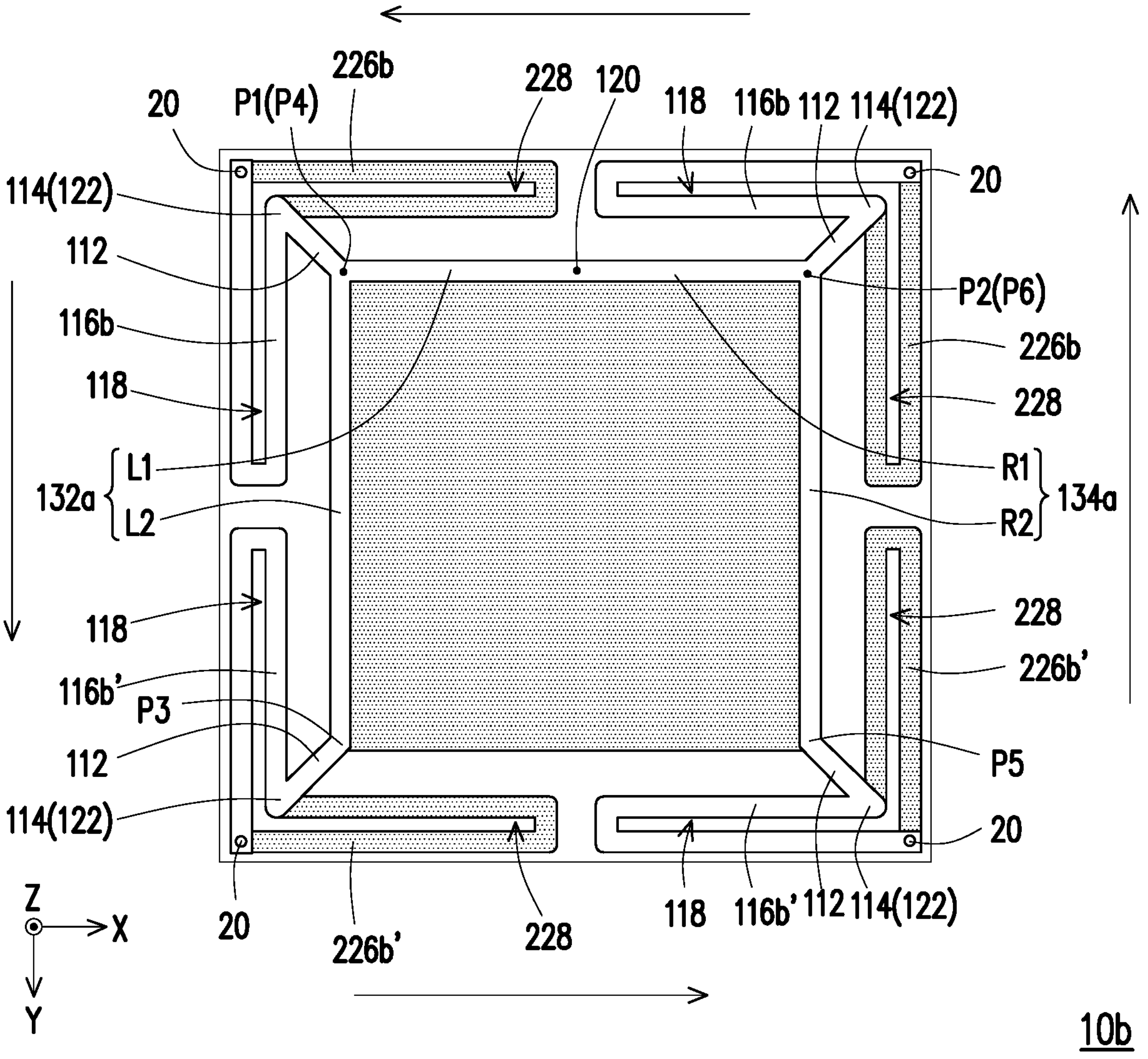

FIG. 9 and FIG. 10 are schematic diagrams of an antenna device according to another embodiment of the disclosure from different viewing angles. Referring to FIG. 9 and FIG. 10, the main difference between the antenna device 10*b* of FIG. 9 and the antenna device 10*a* of FIG. 5 is that, in this embodiment, the first radiating portion 116*b* (or 116*b*') of each of the first antenna structures 110 forms a first folded portion. For example, each of the first radiating portions 116*b* (or 116*b*') is U-shaped, and the first slot 118 is, for example, formed in the first folded portion. In other embodiments, the first folded portion may only form a small part of the bend, without forming the first slot 118.

The second radiating portion 226*b* (or 226*b*') of each of the second antenna structures 220 forms a second folded portion. For example, each of the second radiating portions 226*b* (or 226*b*') is U-shaped, and the second slot 228 is, for example, formed in the second folded portion. In other embodiments, the second folded portion may only form a small part of the bend, without forming the second slot 228.

It may be seen from FIG. 10 that the projection of the first folded portion (i.e., the first radiating portion 116*b* or 116*b*') of each of the first antenna structures 110 projected on the second plane Z2 and the corresponding second folded portion (i.e., the corresponding second radiating portion 226*b* or 226*b*') of the second antenna structure 220 jointly form a ring. For example, the first folded portion and the second folded portion that jointly form a ring may be symmetrical or asymmetrical, that is, the first radiating portion 116*b* (or 116*b*') and the corresponding second radiating portion 226*b* (or 226*b*') may be of equal or unequal length.

In addition, the antenna device 10*b* further selectively includes multiple via holes 20, and each of the via holes 20 is connected between the corresponding first folded portion (i.e., the first radiating portion 116*b* or 116*b*') and the corresponding second folded portion (i.e., the corresponding second radiating portion 226*b* or 226*b*'). For example, each of the via holes 20 is connected between the end of the corresponding first folded portion (i.e., the first radiating portion 116*b* or 116*b*') and the end of the corresponding second folded portion (i.e., the corresponding second radiating portion 226*b* or 226*b*'). In other embodiments, the length of at least one of the first folded portion and the corresponding second folded portion may be extended compared to the embodiments shown in FIG. 9 and FIG. 10, so that the overlapping portion of the first folded portion and the corresponding second folded portion is not necessarily at the end. In this case, the via hole 20 may also be disposed at a portion other than the end of the first folded portion, and/or a portion other than the end of the corresponding second folded portion.

Of course, in other embodiments, the projection of the first radiating portion 116*b* or 116*b*' projected on the second plane Z2 and the corresponding second radiating portion 226*b* or 226*b*' may also jointly form a non-closed ring, or may not be ring-shaped. In addition, the antenna device 10*b* may not have the via hole 20, which is not limited by the drawings.

Figure 11:
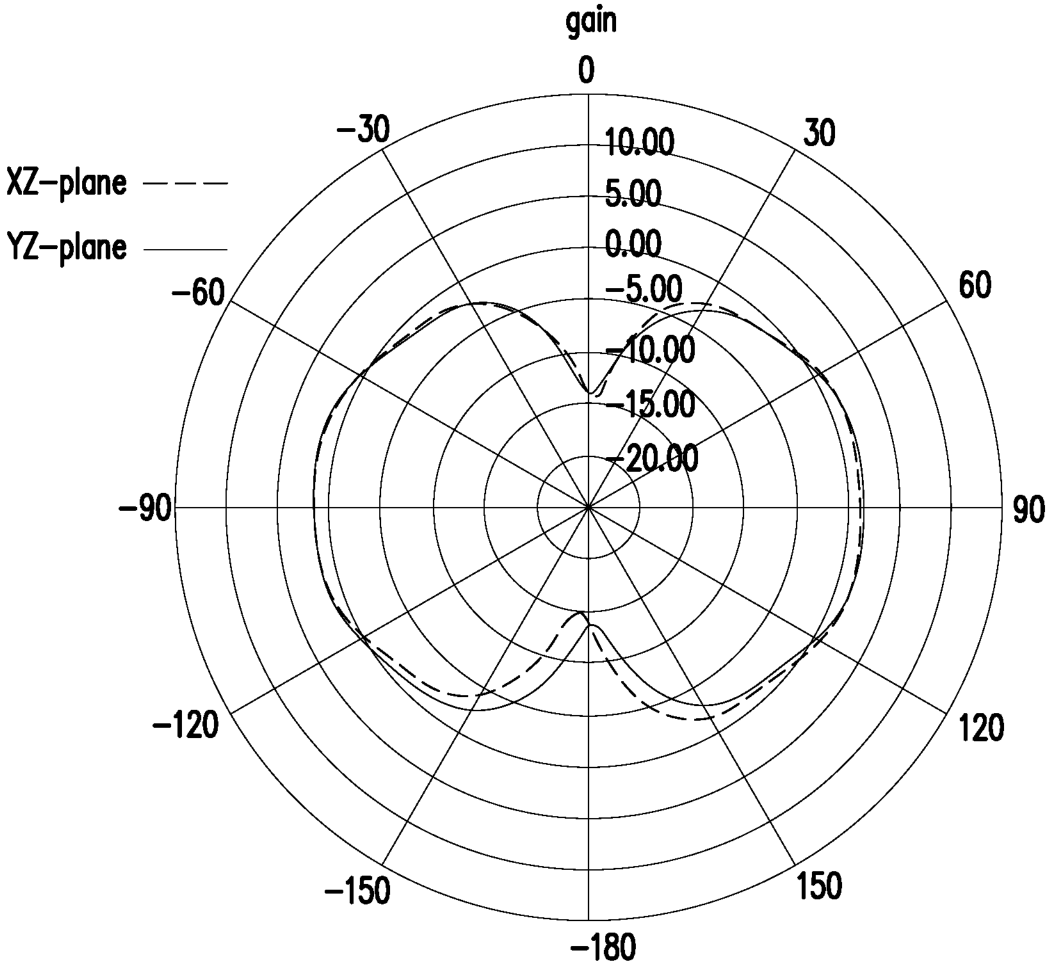
FIG. 11 is a radiation pattern diagram of the antenna device in FIG. 9.

FIG. 11 is a radiation pattern diagram of the antenna device in FIG. 9. Referring to FIG. 11, FIG. 11 is the radiation pattern produced by the antenna device 10*b* of FIG. 9. FIG. 11 shows the cross-section of the radiation pattern on the XZ plane and the cross-section of the radiation pattern on the YZ plane, which may be verified from FIG. 11. The radiation pattern of the antenna device 10*b* in FIG. 9 is an omnidirectional pattern, and has good performance.

Figure 12:
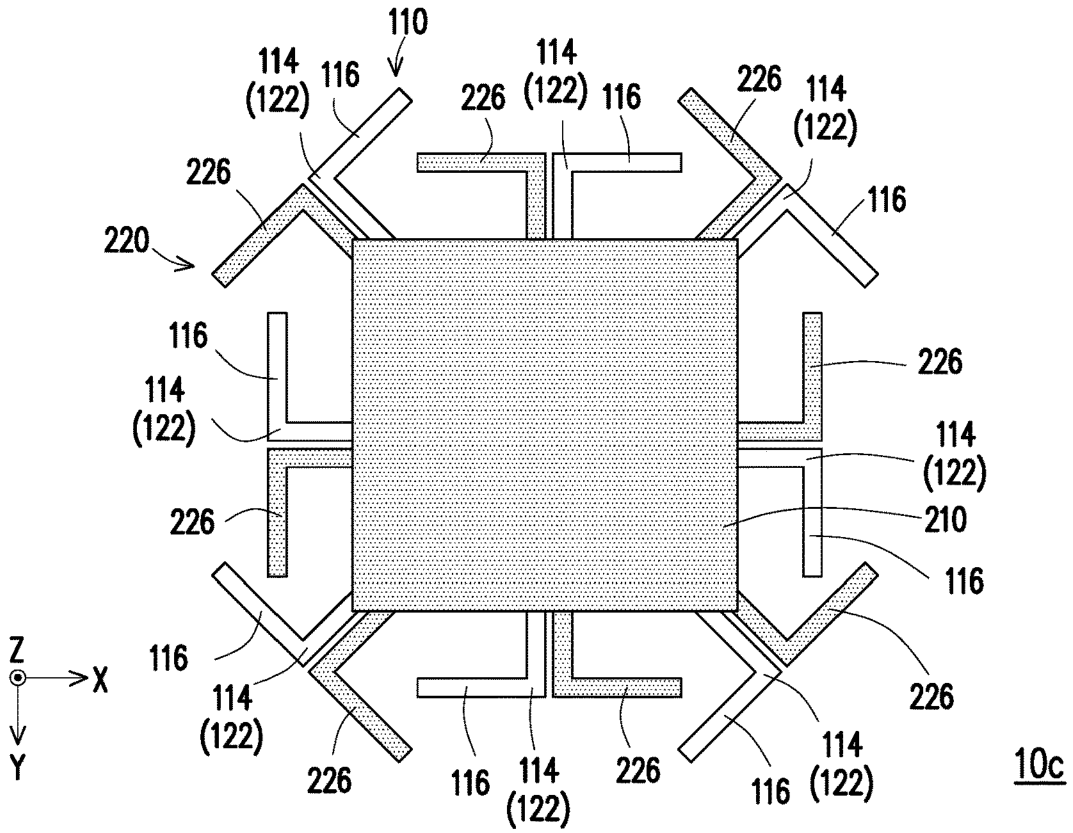
FIG. 12 and FIG. 13 are top schematic views of various antenna devices according to other embodiments of the disclosure.
Figure 13:
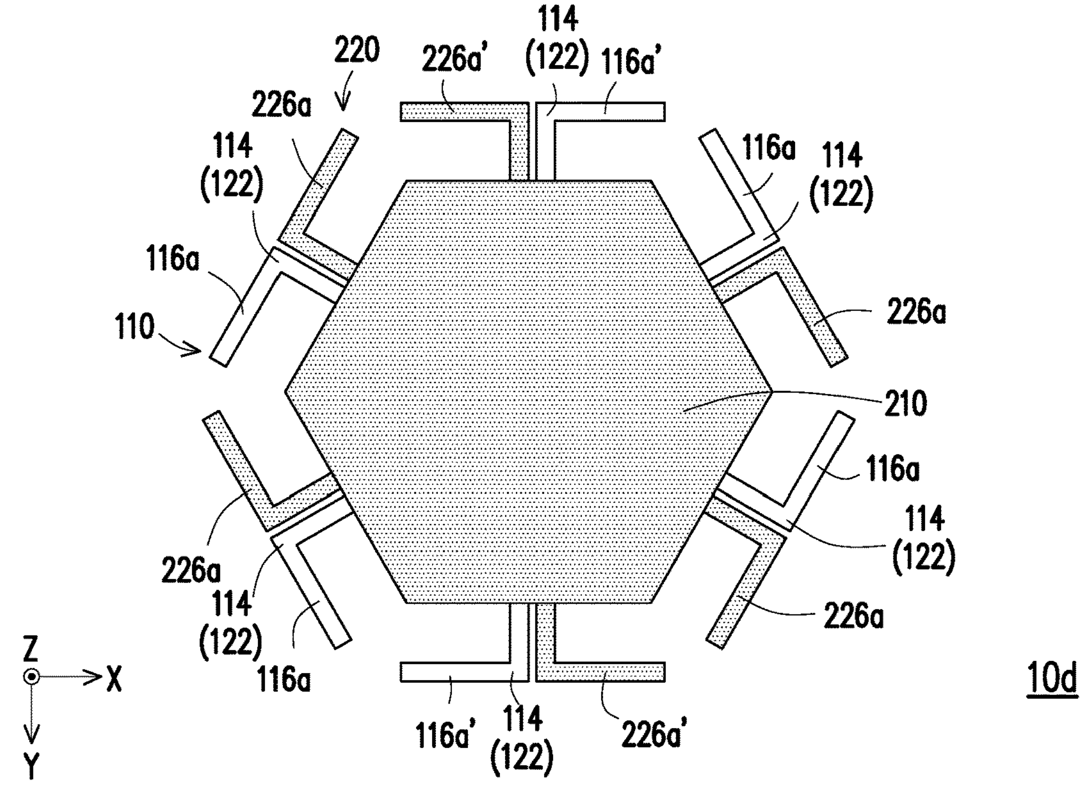

FIG. 12 and FIG. 13 are top schematic views of various antenna devices according to other embodiments of the disclosure. Please note that the transmission line 130 is omitted in FIG. 12 and FIG. 13. Referring to FIG. 12 first, the antenna device 10*c* of FIG. 12 is similar to the antenna device 10 of FIG. 1. Since the phase differences of the multiple signals respectively fed from the branch feeding points 122 in FIG. 12 are within plus or minus 30 degrees (e.g., the phase difference is 0), similar to the antenna device 10 of FIG. 1, in FIG. 12, all the first antenna structures 110 in the antenna device 10*c* are configured along the same clock direction with the first antenna structure 110. All the second antenna structures 220 in the antenna device 10*c* are configured along another clock direction, so that the surrounding radiation current may be clockwise or counterclockwise at the same time.

The main difference between the antenna device 10*c* in FIG. 12 and the antenna device 10 in FIG. 1 is that in this embodiment, the number of the first antenna structures 110 is eight, and the number of the second antenna structures 220 is eight. The projections of four first antenna structures 110 projected on the plane where the conductor 210 is located (i.e., the second plane Z2 in FIG. 1) are respectively located on four corners (e.g., the vertices) of the conductor 210. The projections of four first antenna structures 110 projected on the plane where the conductor 210 is located (i.e., the second plane Z2 in FIG. 1) are respectively located on four sides of the conductor 210. The second antenna structure 220 is also in a corresponding configuration.

Referring to FIG. 13, the antenna device 10*d* of FIG. 13 is similar to the antenna device 10*a* of FIG. 5. Since the phase differences between a part and another part of the multiple signals fed from these branch feeding points 122 in FIG. 13 are within 150 degrees to 210 degrees (e.g., the phase difference is 180 degrees), similar to the antenna device 10*a* in FIG. 5, the turning direction of a part of the first antenna structure 110 is opposite to the turning direction of another part of the first antenna structure 110 in the antenna device 10*d* of FIG. 13, and the turning direction of a part of the second antenna structure 220 is opposite to the turning direction of another part of the second antenna structure 220. For example, the turning directions of the first antenna structures 110 on the upper right, lower right, upper left, and lower left (having the first radiating portion 116*a*) are opposite to those of the first antenna structures 110 on the middle upper and middle lower (having the first radiating portion 116*a*') (counterclockwise and clockwise). The turning directions of the second antenna structures 220 on the upper right, lower right, upper left, and lower left (having the second radiating portion 226*a*) are opposite to those of the second antenna structures 220 on the middle upper and middle lower (having the second radiating portion 226*a*') (clockwise and counterclockwise). In this way, the surrounding radiation current may be clockwise or counterclockwise at the same time.

The main difference between the antenna device 10*d* of FIG. 13 and the antenna device 10*a* of FIG. 5 is that, in this embodiment, the shape of the conductor 210 is hexagonal, and the projection of the first antenna structure 110 projected on the plane where the conductor 210 is located (i.e., the second plane Z2 in FIG. 5) is located on a side of the conductor 210. The second antenna structure 220 is also in a corresponding configuration.

It should be noted that although in the above embodiment, the number of the first antenna structure 110 and the number of the second antenna structure 220 are even numbers, but in other embodiments, the number of the first antenna structure 110 and the number of the second antenna structure 220 may also be an odd number, which is not limited to the above.

Figure 14:
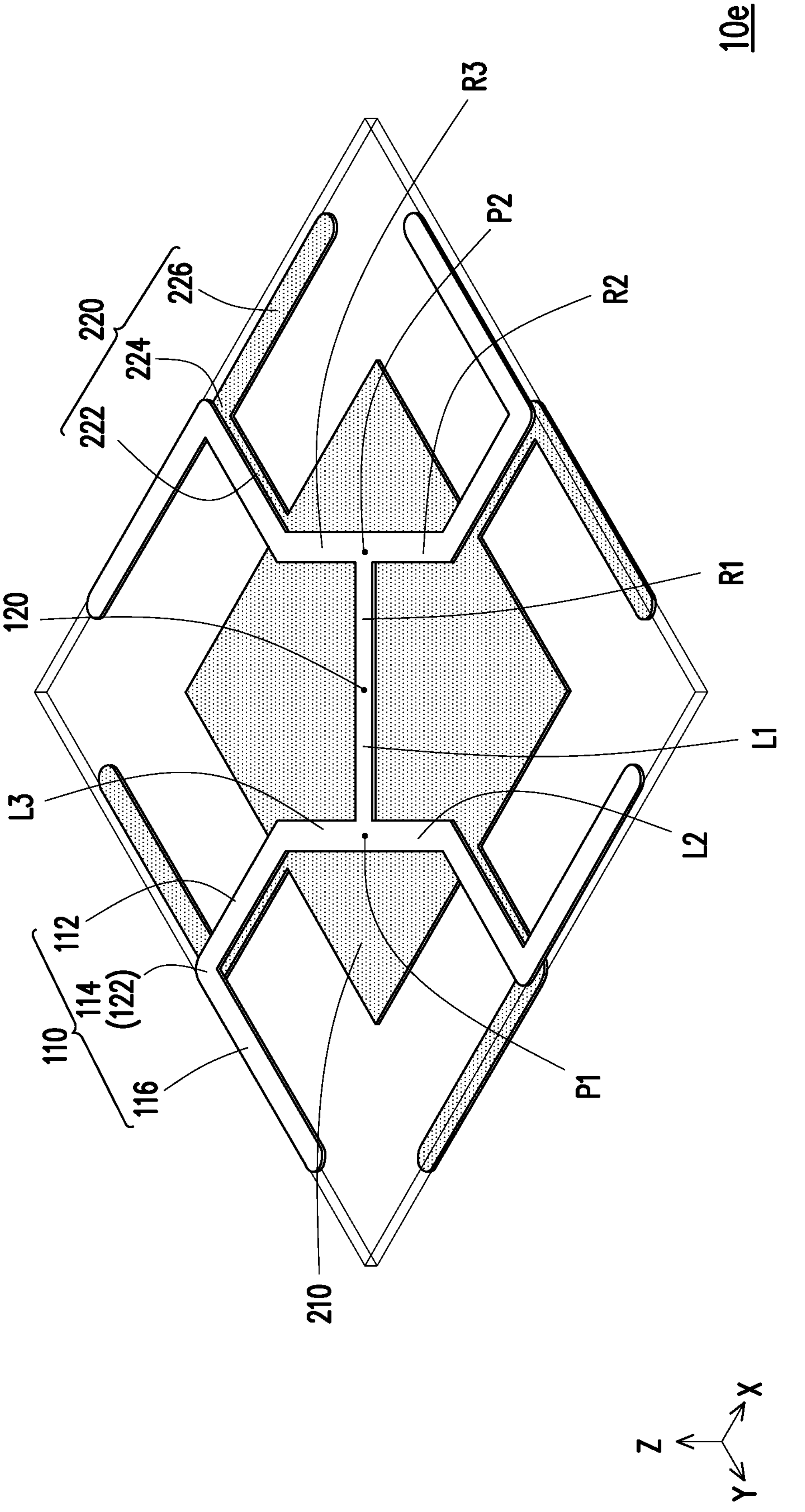
FIG. 14 and FIG. 15 are schematic diagrams of an antenna device according to another embodiment of the disclosure from different viewing angles.
Figure 15:
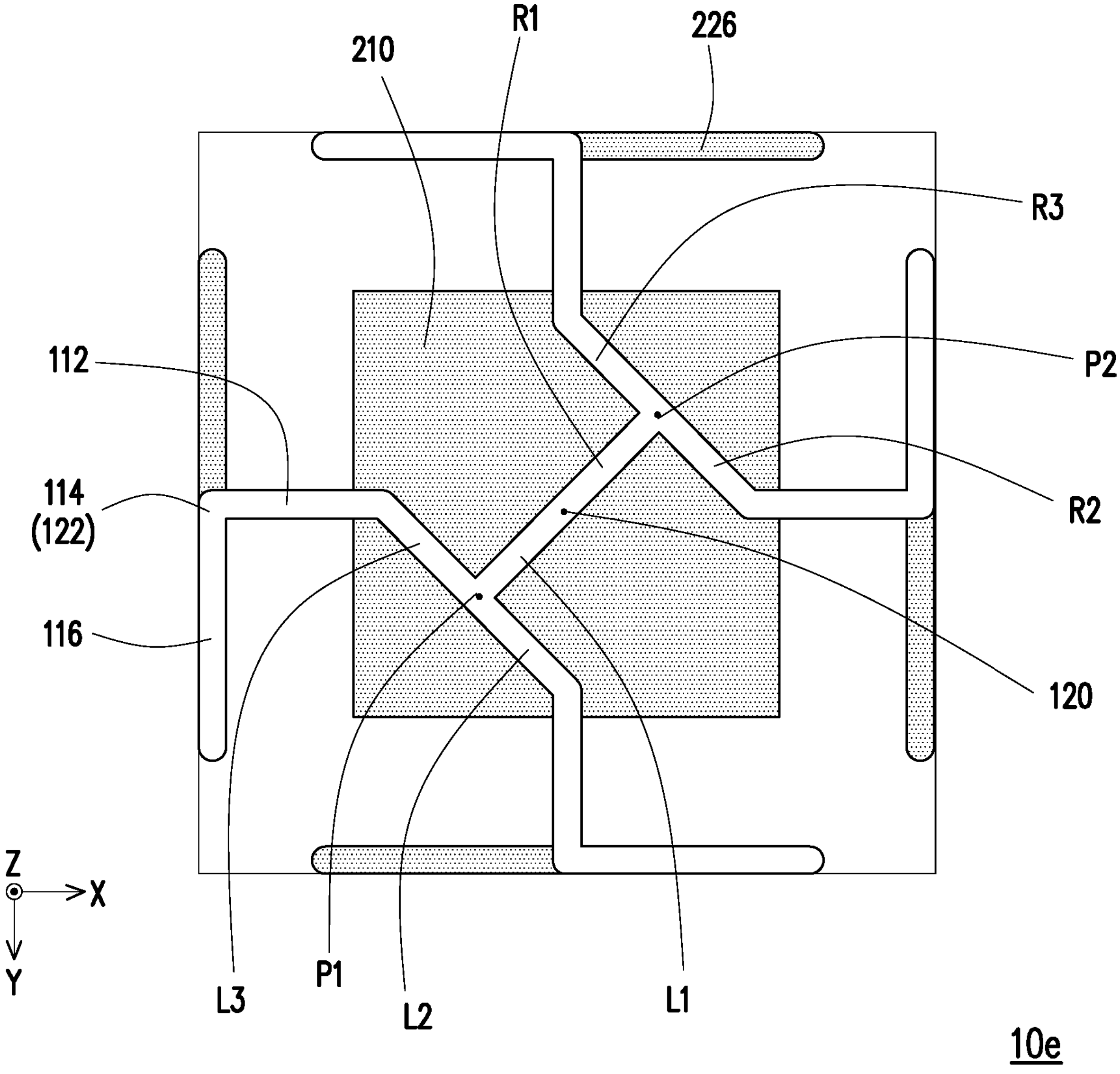

FIG. 14 and FIG. 15 are schematic diagrams of an antenna device according to another embodiment of the disclosure from different viewing angles. Referring to FIG. 14 and FIG. 15, the shape of the conductor 210 is a polygon, such as a quadrilateral. Of course, in other embodiments, the shape of the conductor 210 may also be another polygon, circle, oval, or irregular shapes including curves. The main difference between the antenna device 10*e* in FIG. 14 and the antenna device 10 in FIG. 1 is that, in this embodiment, the second antenna structures 220 are connected to the sides of the conductor 210. In addition, the projection of the main feeding point 120 projected on the plane where the conductor 210 is located (i.e., the second plane Z2 in FIG. 1) is located on the center of the conductor 210. The projections of the first subsidiary feeding point P1 and the second subsidiary feeding point P2 projected on the plane where the conductor 210 is located (i.e., the second plane Z2 in FIG. 1) are, for example, located on the diagonal line of the conductor 210. Since the phase differences of the multiple signals respectively fed from the branch feeding points 122 in FIG. 14 are within plus or minus 30 degrees (e.g., the phase difference is 0), similar to the antenna device 10 of FIG. 1, in FIG. 14, all the first antenna structures 110 in the antenna device 10*e* are configured along the same clock direction with the first antenna structure 110. All the second antenna structures 220 in the antenna device 10*e* are configured along another clock direction, so that the surrounding radiation current may be clockwise or counterclockwise at the same time.

Figure 16:
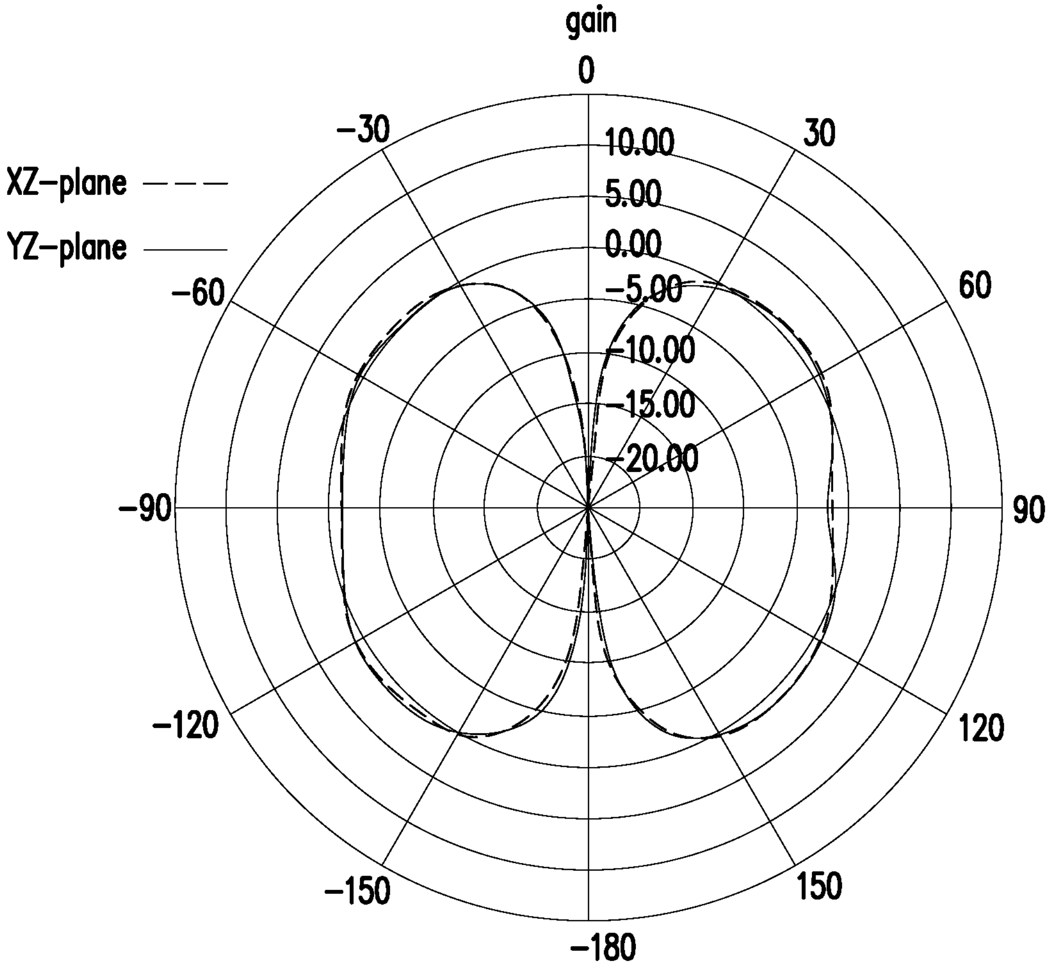
FIG. 16 is a radiation pattern diagram of the antenna device in FIG. 14.

FIG. 16 is a radiation pattern diagram of the antenna device in FIG. 14. Referring to FIG. 16, FIG. 16 is the radiation pattern produced by the antenna device 10*e* of FIG. 14. FIG. 16 shows the cross-section of the radiation pattern on the XZ plane and the cross-section of the radiation pattern on the YZ plane, which may be verified from FIG. 16. The radiation pattern of the antenna device 10*e* in FIG. 14 is an omnidirectional pattern, and has good performance.

Figure 17:
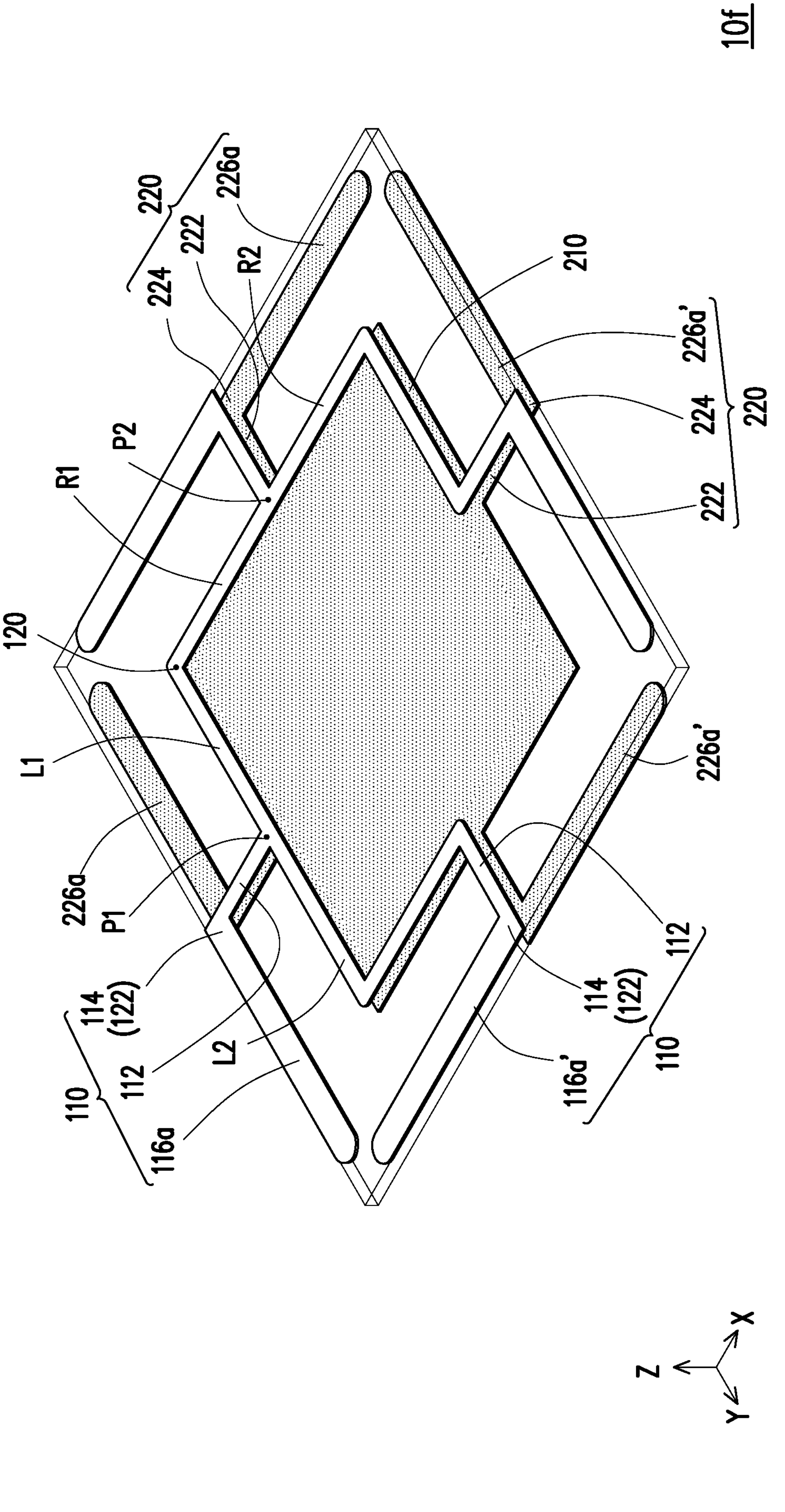
FIG. 17 and FIG. 18 are schematic diagrams of an antenna device according to another embodiment of the disclosure from different viewing angles.
Figure 18:
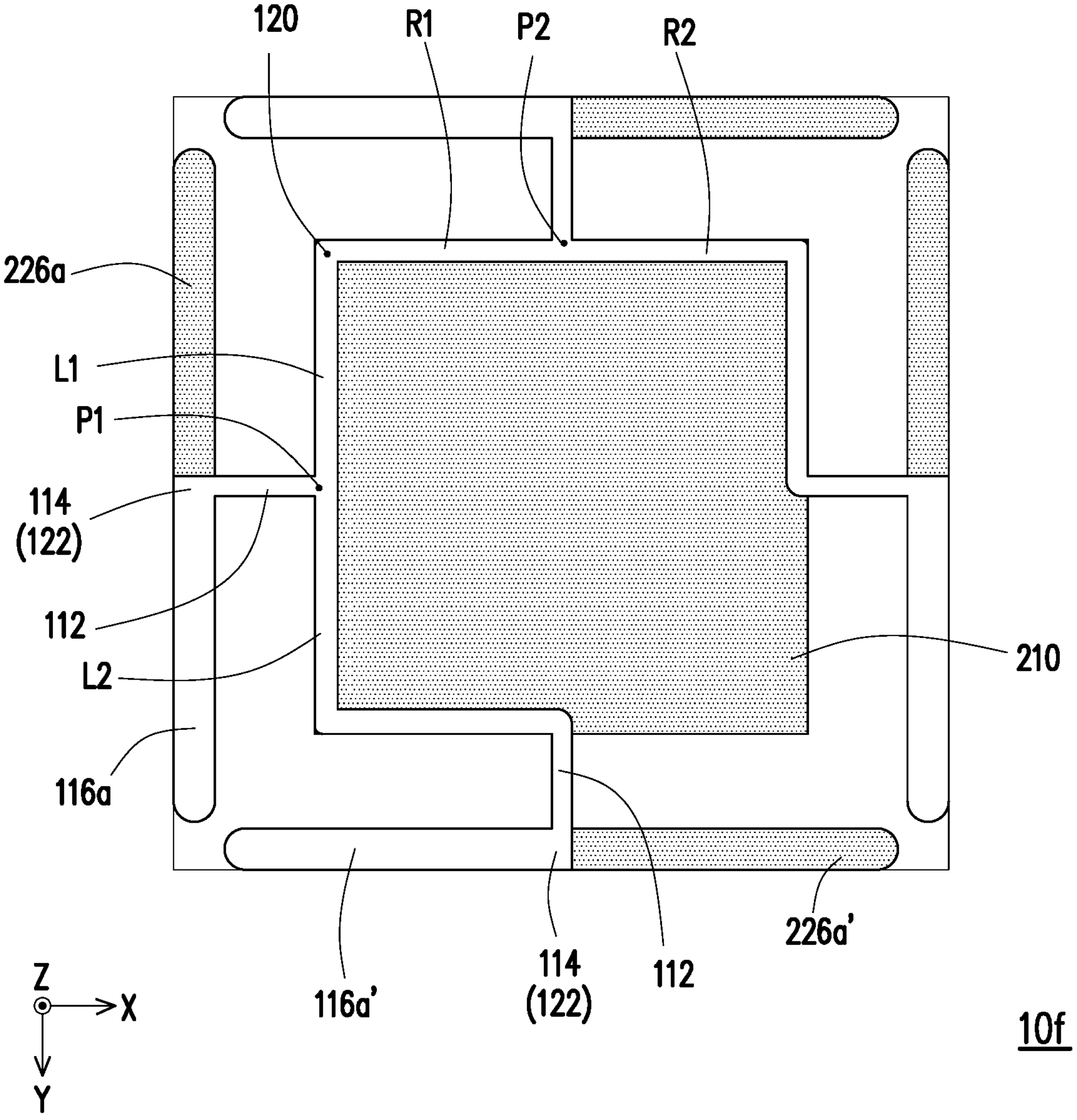

FIG. 17 and FIG. 18 are schematic diagrams of an antenna device according to another embodiment of the disclosure from different viewing angles. Referring to FIG. 17 and FIG. 18, the shape of the conductor 210 is a polygon, such as a quadrilateral. Of course, in other embodiments, the shape of the conductor 210 may also be another polygon, circle, oval, or irregular shapes including curves. The main difference between the antenna device 10*f* in FIG. 17 and the antenna device 10*a* in FIG. 5 is that, in this embodiment, the second antenna structures 220 are connected to the sides of the conductor 210. In addition, the projection of the main feeding point 120 projected on the plane where the conductor 210 is located (i.e., the second plane Z2 in FIG. 5) is located on the corner of the conductor 210. The projections of the first subsidiary feeding point P1 and the second subsidiary feeding point P2 projected on the plane where the conductor 210 is located (i.e., the second plane Z2 in FIG. 5) are, for example, located on the side of the conductor 210. Since the phase differences between a part and another part of the multiple signals fed from these branch feeding points 122 in FIG. 17 are within 150 degrees to 210 degrees (e.g., the phase difference is 180 degrees), similar to the antenna device 10*a* in FIG. 5, the turning direction of a part of the first antenna structure 110 is opposite to the turning direction of another part of the first antenna structure 110 in the antenna device 10*f* of FIG. 17, and the turning direction of a part of the second antenna structure 220 is opposite to the turning direction of another part of the second antenna structure 220. In this way, the surrounding radiation current may be clockwise or counterclockwise at the same time.

Figure 19:
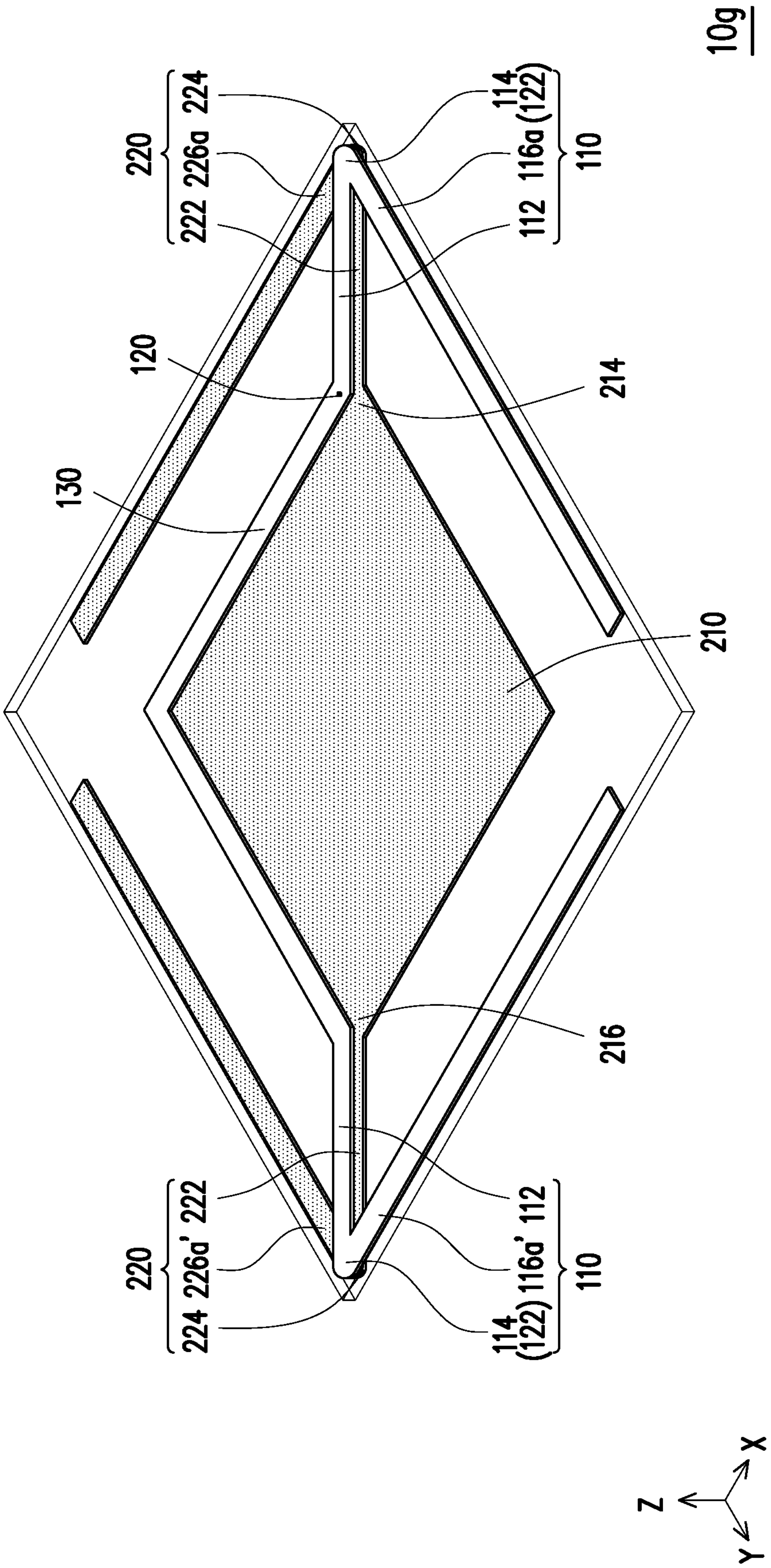
FIG. 19 and FIG. 20 are schematic diagrams of an antenna device according to another embodiment of the disclosure from different viewing angles.
Figure 20:
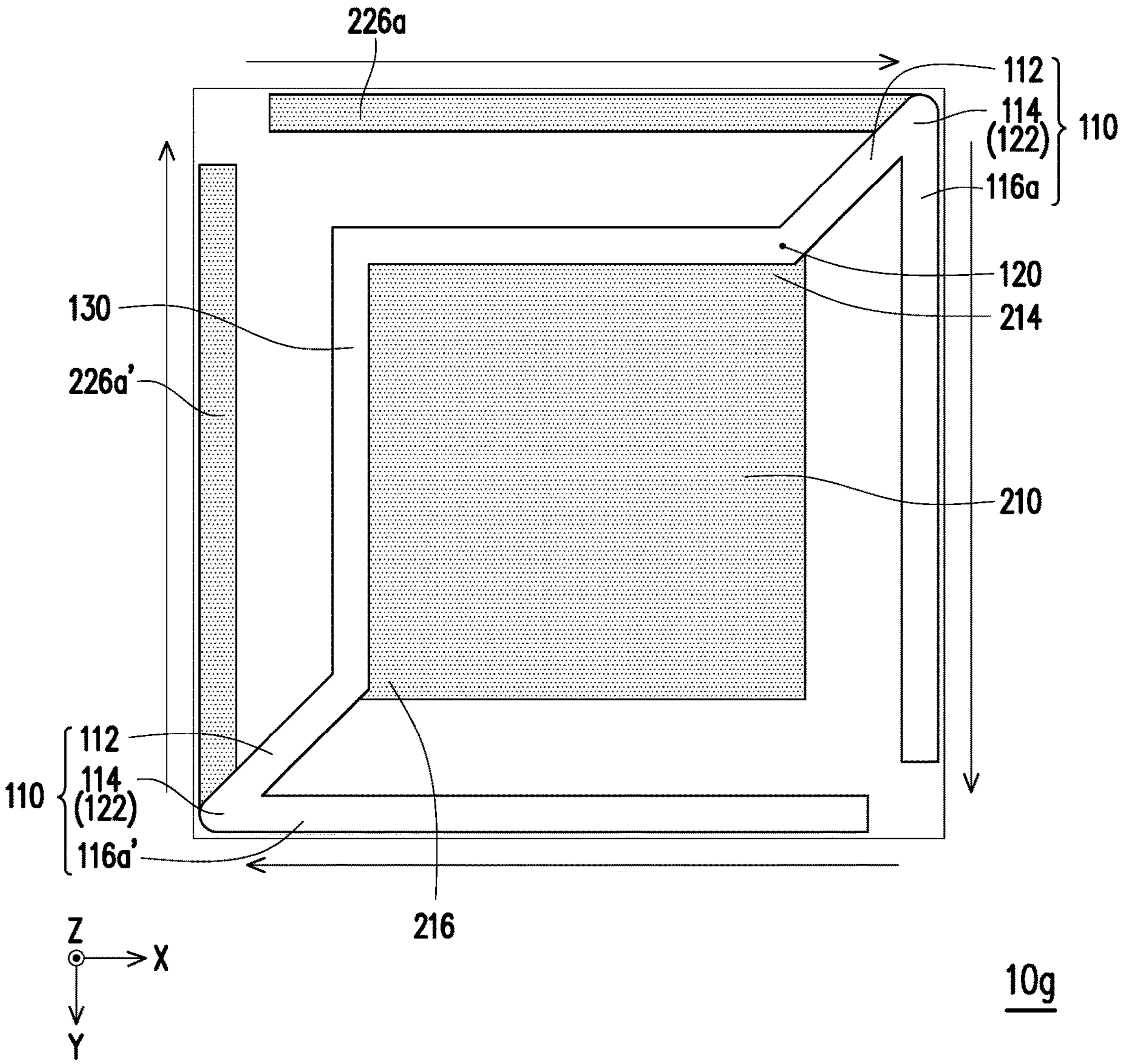

FIG. 19 and FIG. 20 are schematic diagrams of an antenna device according to another embodiment of the disclosure from different viewing angles. Referring to FIG. 19 and FIG. 20, the main difference between the antenna device 10*g* of FIG. 19 and the antenna device 10*a* of FIG. 5 is that, in this embodiment, the number of the first antenna structure 110 is two, the number of the second antenna structure 220 is two, and the transmission line 130 respectively connects the two first transmission portions 112 of the two first antenna structures 110. In addition, the main feeding point 120 is located on the transmission line 130. In this embodiment, the shape of the conductor 210 is a polygon, such as a quadrilateral. Of course, in other embodiments, the shape of the conductor 210 may also be another polygon, circle, oval, or irregular shapes including curves. In this embodiment, the conductor 210 is respectively connected to the two second transmission portions 222 of the two second antenna structures 220, and the projection of the main feeding point 120 projected on the plane where the conductor 210 is located (i.e., the second plane Z2 in FIG. 5) deviates from the center of the conductor 210. Furthermore, the two second antenna structures 220 are connected to two of the corners of the conductor 210 (e.g., two vertices located at opposite corners). The projection of the main feeding point 120 projected on the plane where the conductor 210 is located (i.e., the second plane Z2 in FIG. 5) is, for example, located at one of the corners of the conductor 210. The projection of the transmission line 130 projected on the plane where the conductor 210 is located (i.e., the second plane Z2 in FIG. 5) is, for example, extending along the two sides of the conductor 210. In this way, it may concede more space for other electronic components to avoid interference between electronic components and transmission lines or to reduce influence of electronic components on transmission signals. Furthermore, the two branch feeding points 122 in FIG. 19 are respectively located at the first turning portion 114 of the corresponding first antenna structure 110. The phase difference of the two signals respectively fed from the two branch feeding points 122 is between 150 degrees and 210 degrees. Therefore, the antenna device 10*g* in FIG. 19 is configured such that the turning directions of the two first antenna structures 110 are opposite to each other, and the turning directions of the two second antenna structures 220 are opposite to each other.

In this way, similar to the antenna device 10*a* of FIG. 5, when the antenna device 10*g* in FIG. 19 is in operation, the first radiating portions 116*a* and 116*a*' of the two first antenna structures 110 and the second radiating portions 226*a* and 226*a*' of the two second antenna structures 220 form radiation currents that are both counterclockwise. Alternatively, the first radiating portions 116*a* and 116*a*' of the two first antenna structures 110 and the second radiating portions 226*a* and 226*a*' of the two second antenna structures 220 may also form radiation currents that are both clockwise, thereby the antenna device 10*g* may form an omnidirectional radiation pattern. As mentioned above, the above configuration may still provide an omnidirectional radiation pattern when the phase difference of the fed signal is between 150 degrees and 210 degrees. Therefore, a relatively flexible circuit configuration may be provided, the structure of the antenna device is relatively simple, and the occupied space may also be relatively small.

Figure 21:
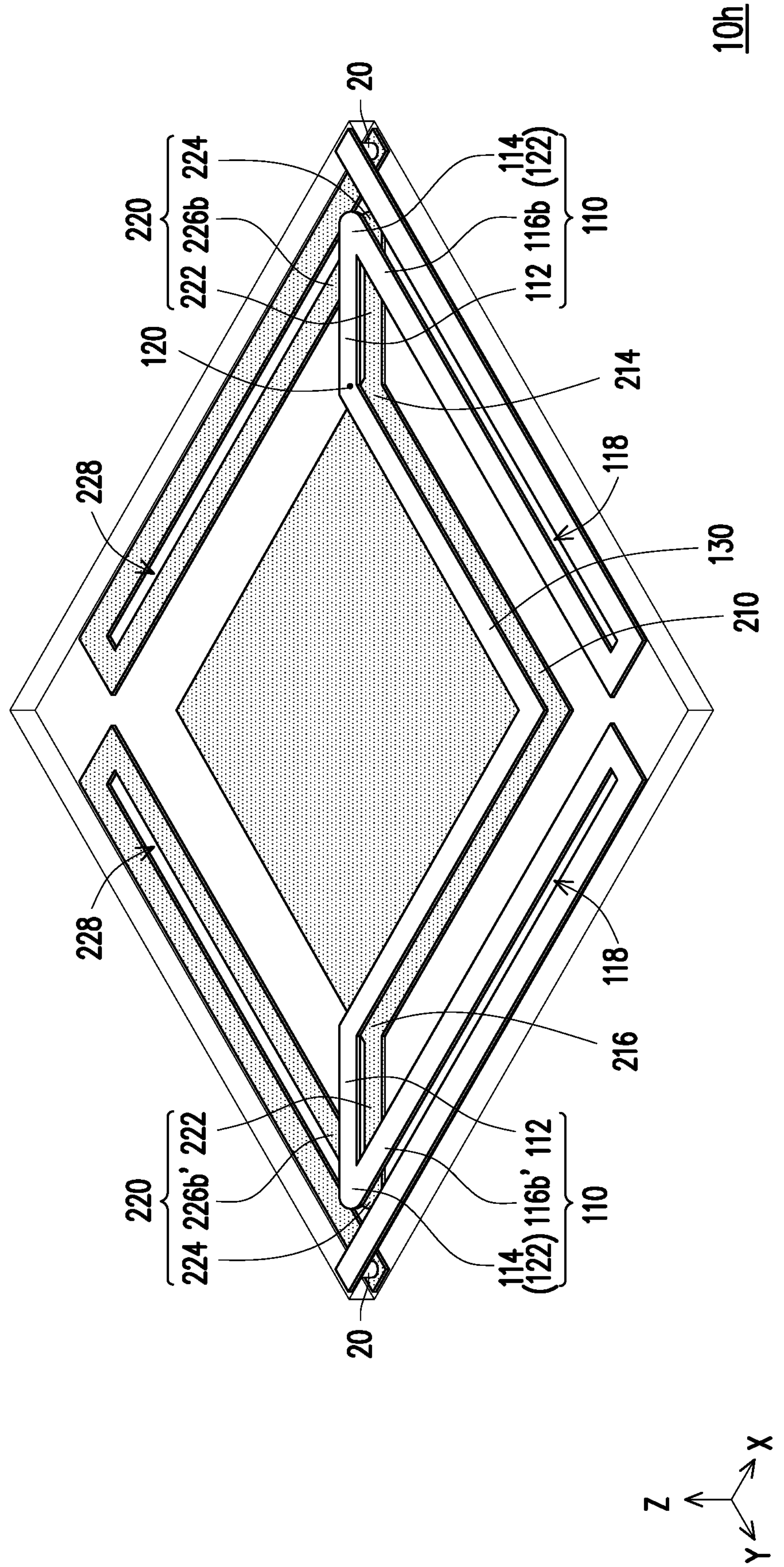
FIG. 21 and FIG. 22 are schematic diagrams of an antenna device according to another embodiment of the disclosure from different viewing angles.
Figure 22:
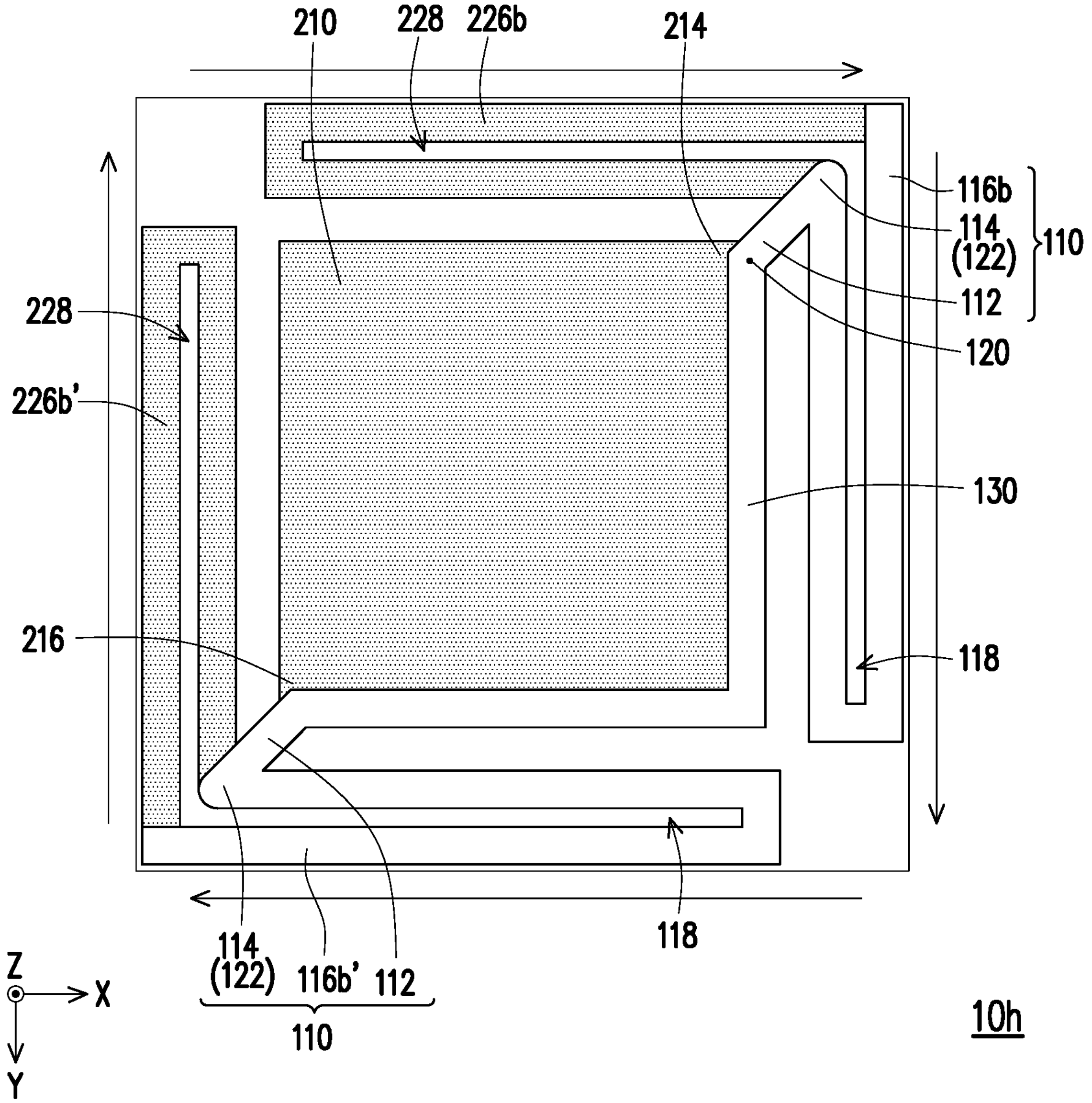

FIG. 21 and FIG. 22 are schematic diagrams of an antenna device according to another embodiment of the disclosure from different viewing angles. Referring to FIG. 21 and FIG. 22, the main difference between the antenna device 10*h* of FIG. 21 and the antenna device 10*g* of FIG. 19 is that, in this embodiment, the first radiating portion 116*b* (or 116*b*') of the two first antenna structures 110 form a first folded portion. For example, the first radiating portion 116*b* (or 116*b*') is U-shaped, and the first slot 118 is formed in the first folded portion. The second radiating portion 226*b* (or 226*b*') of each of the two second antenna structures 220 forms a second folded portion. For example, the second radiating portion 226*b* (or 226*b*') is U-shaped, and the second slot 228 is formed in the second folded portion. In other embodiments, the first folded portion or the second folded portion may only form a small part of the bend without forming the first slot 118 or the second slot 228.

It may be seen from FIG. 22 that the projection of the first folded portion (i.e., the first radiating portion 116*b* or 116*b*') of each of the two first antenna structures 110 projected on the plane where the conductor 210 is located (i.e., the second plane Z2 in FIG. 5) and the corresponding second folded portion (i.e., the corresponding second radiating portion 226*b* or 226*b*') of the second antenna structure 220 jointly form a ring. For example, the first folded portion and the second folded portion that jointly form a ring may be symmetrical or asymmetrical, that is, the first radiating portion 116*b* (or 116*b*') and the corresponding second radiating portion 226*b* (or 226*b*') may be of equal or unequal length.

In addition, as may be seen from FIG. 21, the antenna device 10*h* further selectively includes multiple via holes 20, and each of the via holes 20 is connected between the corresponding first folded portion (i.e., the first radiating portion 116*b* or 116*b*') and the corresponding second folded portion (i.e., the corresponding second radiating portion 226*b* or 226*b*'). For example, each of the via holes 20 is connected between the end of the corresponding first folded portion (i.e., the first radiating portion 116*b* or 116*b*') and the end of the corresponding second folded portion (i.e., the corresponding second radiating portion 226*b* or 226*b*'). In other embodiments, the length of at least one of the first folded portion and the corresponding second folded portion may be extended compared to the embodiments shown in FIG. 21 and FIG. 22, so that the overlapping portion of the first folded portion and the corresponding second folded portion is not necessarily at the end. In this case, the via hole 20 may also be disposed at a portion other than the end of the first folded portion, and/or a portion other than the end of the corresponding second folded portion.

Of course, in other embodiments, the projection of the first radiating portion 116*b* or 116*b*' projected on the plane where the conductor 210 is located (i.e., the second plane Z2 in FIG. 5) and the corresponding second radiating portion 226*b* or 226*b*' may also jointly form a non-closed ring, or may not be ring-shaped. In addition, the antenna device 10*h* may not have the via hole 20, which is not limited by the drawings.

The radiation pattern of the above-mentioned antenna device is an omnidirectional radiation pattern. In other embodiments, if a conical radiation pattern is required, reference may be made to the following implementation.

Figure 23:
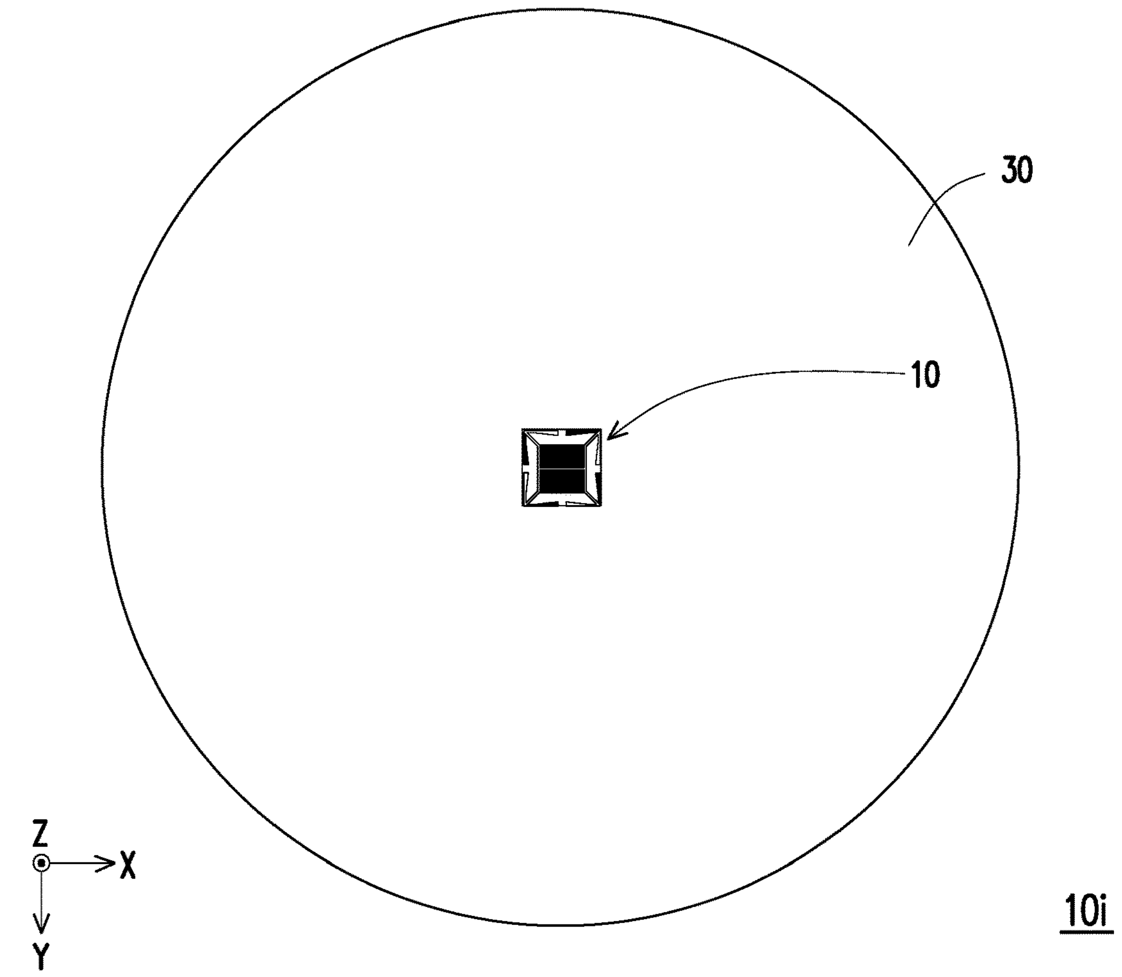
FIG. 23 and FIG. 24 are schematic diagrams of an antenna device according to another embodiment of the disclosure from different viewing angles.
Figure 24:
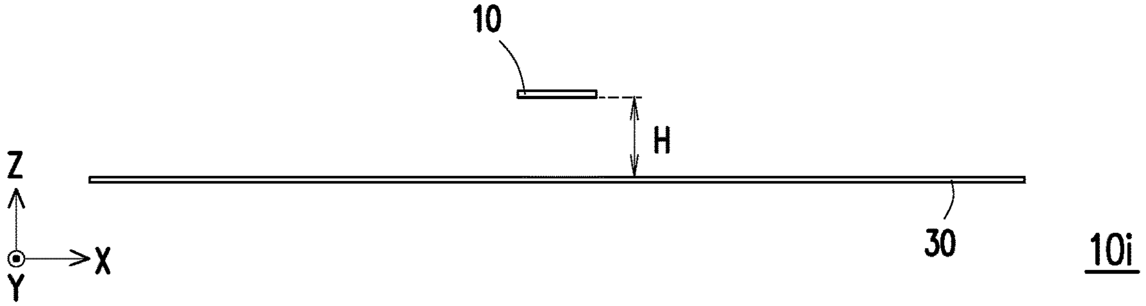

FIG. 23 and FIG. 24 are schematic diagrams of an antenna device according to another embodiment of the disclosure from different viewing angles. Referring to FIG. 1, FIG. 23, and FIG. 24 at the same time, the antenna device 10*i* includes the antenna device 10 and a reflector 30. The first structural layer 100 (FIG. 1) is located between the second structural layer 200 (FIG. 1) and the reflector 30. The distance H between the reflector 30 and the first structural layer 100 (FIG. 1) of the antenna device 10 is greater than or equal to 0.1 free space wavelength and less than or equal to 1 free space wavelength, for example, 0.5 free space wavelength. The free space wavelength refers to the wavelength in the free space of the signal received by the antenna device 10 or the signal transmitted by the antenna device 10 in the frequency band in which the antenna device 10 operates.

Alternatively, the second structural layer 200 (FIG. 1) is located between the first structural layer 100 (FIG. 1) and the reflector 30, and the distance H between the reflector 30 and the second structural layer 200 is greater than or equal to 0.1 free space wavelength and less than or equal to 1 free space wavelength, for example, 0.5 free space wavelength.

Such a design enables the antenna device 10*i* to generate a conical radiation pattern.

Figure 25:
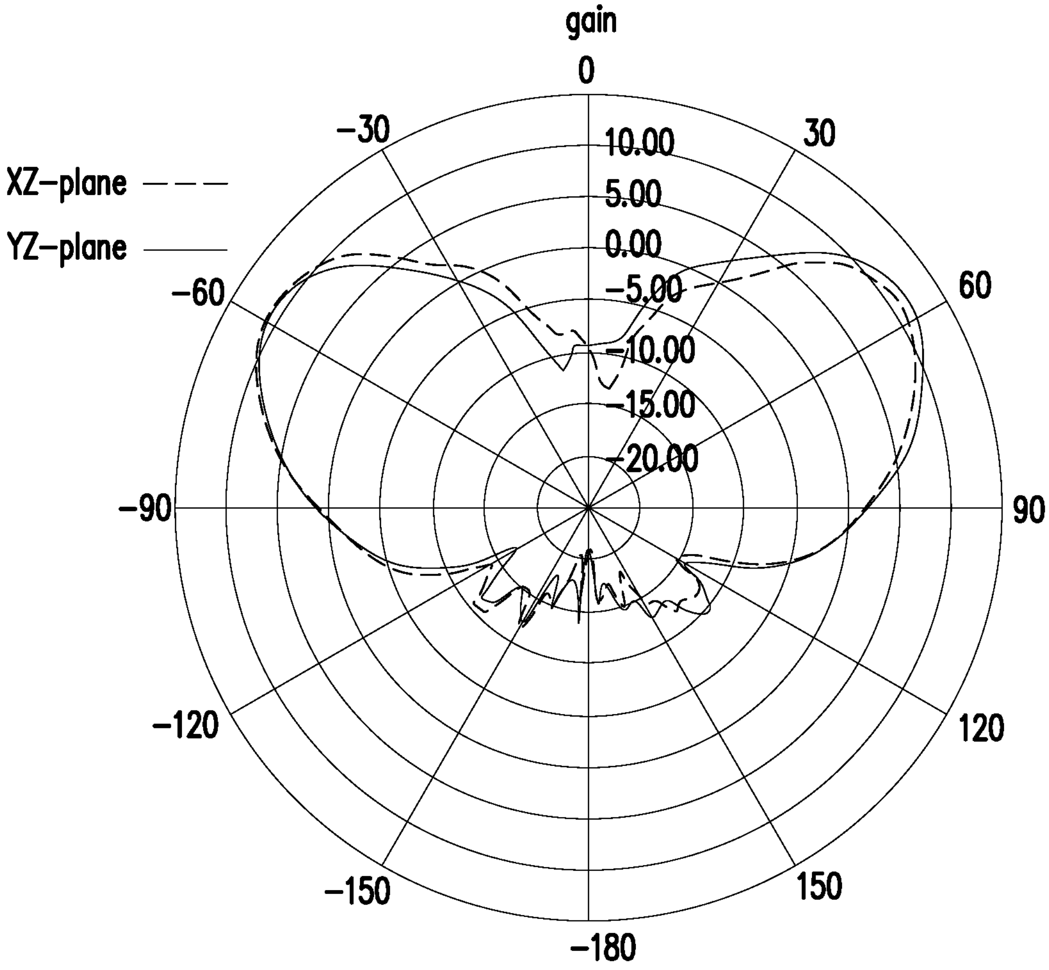
FIG. 25 is a radiation pattern diagram of the antenna device in FIG. 23.

FIG. 25 is a radiation pattern diagram of the antenna device in FIG. 23. Referring to FIG. 25, FIG. 25 is the radiation pattern produced by the antenna device 10*i* of FIG. 23. FIG. 25 shows the cross-section of the radiation pattern on the XZ plane and the cross-section of the radiation pattern on the YZ plane, which may be verified from FIG. 25. The radiation pattern of the antenna device 10*i* in FIG. 23 is a conical radiation pattern, and has good performance.

Of course, in other embodiments, the antenna device 10*i* may also include the antenna device 10', 10*a*, 10*b*, 10*c*, 10*d*, 10*e*, 10*f*, 10*g*, or 10*h*, and the reflector 30, so as to generate a conical radiation pattern, which is not limited by the combination of the antenna device 10 and the reflector 30.

In summary, an antenna device according to an embodiment of the disclosure includes a first structural layer disposed on a first plane and a second structural layer disposed on a second plane, and the second plane is parallel to or coincides with the first plane. The main feeding point of the first structural layer connects the first transmission line segment and a part of the first antenna structure to form the first transmission paths, and the first transmission paths share at least part of the paths. The main feeding point of the first structural layer further connects the second transmission line segment and another part of the first antenna structure to form the second transmission paths, and the second transmission paths share at least part of the paths. The projection of at least part of the first antenna structures projected on the second plane is located outside the conductor. In the antenna device according to an embodiment of the disclosure, the above configuration may provide an omnidirectional radiation pattern, and the space occupied by the antenna device may be relatively small. In addition, with the above configuration, the first transmission path extends from the main feeding point to first pass through the first subsidiary feeding point, then the first transmission path connects to different first antenna structures through the first subsidiary feeding point, and is then divided into multiple segments. Such a configuration is beneficial for impedance conversion. It is easier to adjust the line position according to impedance requirements, and it may concede more space for other electronic components to avoid interference between electronic components and transmission lines or to reduce influence of electronic components on transmission signals. Moreover, an antenna device according to another embodiment of the disclosure includes a first structural layer disposed on a first plane and a second structural layer disposed on a second plane, and the second plane is parallel to or coincides with the first plane. The first structural layer includes two first antenna structures, and the turning directions of the two first antenna structures are opposite to each other. The second structural layer includes two second antenna structures, and the turning directions of the two second antenna structures are opposite to each other. The turning direction of each of the two second antenna structures is opposite to the turning direction of the corresponding first antenna structure. The phase difference between the two signals respectively fed from the two branch feeding points located at the two first antenna structures is between 150 degrees and 210 degrees. In the antenna device of another embodiment of the disclosure, the above configuration may still provide an omnidirectional radiation pattern when the phase difference of the fed signal is between 150 degrees and 210 degrees. A relatively flexible circuit configuration may be provided, the structure of the antenna device is relatively simple, and the occupied space may also be relatively small.

What is claimed is:

1. An antenna device, comprising:

a first structural layer, disposed on a first plane, the first structural layer comprising:

a plurality of first antenna structures, separated from each other;

a main feeding point;

a first subsidiary feeding point; and a transmission line, comprising a first transmission line segment and a second transmission line segment, wherein the main feeding point is located between the first transmission line segment and the second transmission line segment, the first transmission line segment is connected to a part of the first antenna structures, and the second transmission line segment is connected to another part of the first antenna structures, a plurality of first transmission paths are formed from the main feeding point to the part of the first antenna structures, the first transmission paths pass through the first subsidiary feeding point, a plurality of second transmission paths are formed from the main feeding point to the another part of the first antenna structures; and a second structural layer, disposed on a second plane, wherein the second plane is parallel to or coincides with the first plane, the second structural layer comprises:

a conductor; wherein at least a part of projections of the first antenna structures projected on the second plane surrounds the conductor.

2. The antenna device according to claim 1, wherein the first structural layer further comprises a second subsidiary feeding point, and the second transmission paths pass through the second subsidiary feeding point.

3. The antenna device according to claim 2, wherein the first transmission line segment comprises a first sub-line segment, a third sub-line segment, and a fifth sub-line segment, the first sub-line segment is located between the first subsidiary feeding point and the main feeding point, the first subsidiary feeding point is located between the first sub-line segment, the third sub-line segment, and the fifth sub-line segment, the third sub-line segment and the fifth sub-line segment are respectively connected between the first subsidiary feeding point and the corresponding first antenna structures, the second transmission line segment comprises a second sub-line segment, a fourth sub-line segment, and a sixth sub-line segment, the second sub-line segment is located between the second subsidiary feeding point and the main feeding point, the second subsidiary feeding point is located between the second sub-line segment, the fourth sub-line segment, and the sixth sub-line segment, the fourth sub-line segment and the sixth sub-line segment are respectively connected between the second subsidiary feeding point and the corresponding first antenna structures, the first antenna structures comprise four first transmission portions, the four first transmission portions are respectively connected to the third sub-line segment through a first junction point, connected to the fourth sub-line segment through a second junction point, connected to the fifth sub-line segment through a third junction point, and connected to the sixth sub-line segment through a fourth junction point, a phase difference between the first junction point and the second junction point of signal fed from the main feeding point is within plus or minus 30 degrees, and a phase difference between the third junction point and the fourth junction point is within plus or minus 30 degrees.

4. The antenna device according to claim 3, wherein a total length of the first sub-line segment and the third sub-line segment is the same as a total length of the second sub-line segment and the fourth sub-line segment, a total length of the first sub-line segment and the fifth sub-line segment is the same as a total length of the second sub-line segment and the sixth sub-line segment.

5. The antenna device according to claim 3, wherein a shape of the conductor is a polygon, a projection of the first subsidiary feeding point projected on the second plane is located on a first side of the conductor, and a projection of the second subsidiary feeding point projected on the second plane is located on a second side of the conductor, the first side is opposite to the second side, a phase difference between the first junction point and the third junction point of signal fed from the main feeding point is within plus or minus 30 degrees, and a phase difference between the second junction point and the fourth junction point is within plus or minus 30 degrees.

6. The antenna device according to claim 5, wherein a length of the third sub-line segment is equal to a length of the fifth sub-line segment, and a length of the fourth sub-line segment is equal to a length of the sixth sub-line segment.

7. The antenna device according to claim 2, wherein the first transmission line segment comprises a first sub-line segment and a third sub-line segment, the first sub-line segment is located between the first subsidiary feeding point and the main feeding point, the first subsidiary feeding point is located between the first sub-line segment, the third sub-line segment, and the corresponding first antenna structure, the second transmission line segment comprises a second sub-line segment and a fourth sub-line segment, the second sub-line segment is located between the second subsidiary feeding point and the main feeding point, the second subsidiary feeding point is located between the second sub-line segment, the fourth sub-line segment, and the corresponding first antenna structure, the first antenna structures comprise four first transmission portions, the four first transmission portions are respectively connected to two ends the third sub-line segment through a first junction point and a third junction point, connected to two ends of the fourth sub-line segment through a second junction point and a fourth junction point, a phase difference between the first junction point and the third junction point of signal fed from the main feeding point is between 150 degrees and 210 degrees, and a phase difference between the second junction point and the fourth junction point of the signal fed from the main feeding point is between 150 degrees and 210 degrees.

8. The antenna device according to claim 7, wherein a total length of the first sub-line segment and the third sub-line segment is the same as a total length of the second sub-line segment and the fourth sub-line segment.

9. The antenna device according to claim 1, wherein the second structural layer further comprises a plurality of second antenna structures, positions of the second antenna structures correspond to positions of the first antenna structures, each of the first antenna structures has a first transmission portion, a first turning portion, and a first radiating portion, the first turning portion is formed between the first transmission portion and the first radiating portion, the first transmission portions of the first antenna structures are connected to the transmission line, each of the second antenna structures has a second transmission portion, a second turning portion, and a second radiating portion, the second turning portion is formed between the second transmission portion and the second radiating portion, the second transmission portions of the second antenna structures are connected to the conductor, a projection of the first transmission portion of each of the first antenna structures projected on the second plane is at least partially coincident with or parallel to the second transmission portion of the corresponding second antenna structure, a turning direction of each of the first antenna structures is opposite to a turning direction of the corresponding second antenna structure.

10. The antenna device according to claim 9, wherein when the antenna device operates, the first antenna structures and the second antenna structures form radiation currents that are both counterclockwise, alternatively, the first antenna structures and the second antenna structures form radiation currents that are both clockwise, the antenna device generates a radiation pattern, the radiation pattern is an omnidirectional radiation pattern, an included angle between an axis with a smallest radiation energy and a normal line of the first plane is greater than or equal to 0 degrees and less than or equal to 20 degrees.

11. The antenna device according to claim 9, wherein the first radiating portions and the second radiating portions are dipole antennas.

12. The antenna device according to claim 9, wherein a projection of the first radiating portion of each of the first antenna structures projected on the second plane is mirror-symmetrical to the second radiating portion of the corresponding second antenna structure with the second transmission portion as a symmetry axis.

13. The antenna device according to claim 9, wherein the first structural layer further comprises a plurality of branch feeding points, each of the branch feeding points is located at the corresponding first turning portion of the first antenna structure, a phase difference between a plurality of signals fed from the branch feeding points is within plus or minus 30 degrees, the turning directions of the first antenna structures are the same.

14. The antenna device according to claim 9, wherein the first structural layer further comprises a plurality of branch feeding points, each of the branch feeding points is located at the corresponding first turning portion of the first antenna structure, a phase difference between one part and another part of a plurality of signals fed from the branch feeding points is between 150 degrees and 210 degrees, the turning direction of the first antenna structure corresponding to the one part of the signals is opposite to the turning direction of the first antenna structure corresponding to the another part of the signals.

15. The antenna device according to claim 9, wherein a shape of the conductor is a polygon, and the second antenna structures are connected to vertices of the conductor.

16. The antenna device according to claim 9, wherein a shape of the conductor is a polygon, and the second antenna structures are connected to sides of the conductor.

17. The antenna device according to claim 1, wherein a projection of the main feeding point projected on the second plane deviates from a center of the conductor.

18. An antenna device, comprising:

a first structural layer, disposed on a first plane, the first structural layer comprising:

two first antenna structures, separated from each other, wherein each of the two first antenna structures has a first transmission portion, a first turning portion, and a first radiating portion, the first turning portion is formed between the first transmission portion and the first radiating portion, turning directions of the two first antenna structures are opposite to each other;

a transmission line, connecting the first transmission portion of each of the two first antenna structures;

a main feeding point, located on the transmission line; and two branch feeding points, wherein each of the two branch feeding points is located at the first turning portion of the corresponding first antenna structure, and a phase difference between two signals respectively fed from the two branch feeding points is between 150 degrees and 210 degrees; and a second structural layer, disposed on a second plane, wherein the second plane is parallel to or coincides with the first plane, and the second structural layer comprises:

two second antenna structures, wherein positions of the two second antenna structures respectively correspond to positions of the two first antenna structures, each of the two second antenna structures has a second transmission portion, a second turning portion, and a second radiating portion, the second turning portion is formed between the second transmission portion and the second radiating portion, turning directions of the two second antenna structures are opposite to each other, the turning direction of each of the two second antenna structures is opposite to the turning direction of the corresponding first antenna structure; and a conductor, connecting the second transmission portion of each of the two second antenna structures.

19. The antenna device according to claim 18, wherein when the antenna device operates, the two first antenna structures and the two second antenna structures form radiation currents that are both counterclockwise, alternatively, the two first antenna structures and the two second antenna structures form radiation currents that are both clockwise, the antenna device generates a radiation pattern, the radiation pattern is an omnidirectional radiation pattern.

20. The antenna device according to claim 18, wherein a projection of the main feeding point projected on the second plane deviates from a center of the conductor.

* * * * *